US009205493B1

(12) United States Patent
Young et al.

(10) Patent No.: US 9,205,493 B1
(45) Date of Patent: Dec. 8, 2015

(54) PRODUCTION OF NANOSTRUCTURES

(75) Inventors: Michael Eugene Young, Emeryville, CA (US); Arjun Srinivas, San Francisco, CA (US); Matthew R. Robinson, San Francisco, CA (US); Alexander Chow Mittal, Berkeley, CA (US)

(73) Assignee: Innova Dynamics, Inc., San Francisco, CA (US)

( * ) Notice: Subject to any disclaimer, the term of this patent is extended or adjusted under 35 U.S.C. 154(b) by 489 days.

(21) Appl. No.: 13/537,011

(22) Filed: Jun. 28, 2012

Related U.S. Application Data

(60) Provisional application No. 61/502,186, filed on Jun. 28, 2011, provisional application No. 61/548,012, filed on Oct. 17, 2011, provisional application No. 61/564,233, filed on Nov. 28, 2011, provisional application No. 61/598,183, filed on Feb. 13, 2012.

(51) Int. Cl.
*B22F 9/24* (2006.01)
*B82Y 40/00* (2011.01)

(52) U.S. Cl.
CPC .. *B22F 9/24* (2013.01); *B82Y 40/00* (2013.01)

(58) Field of Classification Search
None
See application file for complete search history.

(56) References Cited

U.S. PATENT DOCUMENTS

| 4,826,803 | A  | * | 5/1989  | Butler et al. ................. 502/304 |
| 6,727,328 | B1 |   | 4/2004  | Bleijenberg et al. |
| 7,585,349 | B2 |   | 9/2009  | Xia et al. |
| 8,563,325 | B1 | * | 10/2013 | Bartsch et al. ................. 436/180 |
| 2007/0253877 | A1 | * | 11/2007 | Fujita et al. ..................... 423/87 |
| 2008/0210052 | A1 |   | 9/2008  | Allemand |
| 2010/0044925 | A1 | * | 2/2010  | Kwon et al. .................. 264/495 |
| 2010/0224026 | A1 | * | 9/2010  | Brennan Fournet et al. ... 75/370 |
| 2011/0023658 | A1 |   | 2/2011  | Wang et al. |
| 2011/0048170 | A1 |   | 3/2011  | Bhatia et al. |
| 2011/0174190 | A1 |   | 7/2011  | Sepa et al. |
| 2011/0215277 | A1 | * | 9/2011  | Khan et al. ................. 252/408.1 |

OTHER PUBLICATIONS

Carotenuto et al., "Preparation and characterization of nano-sized Ag/PVP composites for optical applications." Eur. Phys. J. B. 16, Nov. 17, 2000.
Sun et al., "Crystalline silver nanowires by soft solution processing." Nano Lett. vol. 2:2, 165-168 (2002).
Sun et al., "Large-scale synthesis of uniform silver nanowires through a soft, self-seeding, polyol process." Adv. Mater. 14:11 (Jun. 5, 2002).

* cited by examiner

*Primary Examiner* — George Wyszomierski
(74) *Attorney, Agent, or Firm* — Foley & Lardner LLP; Cliff Z. Liu

(57) ABSTRACT

Nanostructure morphologies are controlled by incorporating an agitation mechanism that imparts low shear mixing along with purification of a resulting nanostructure product to effectively remove agglomerates and other components of a reaction mixture. In such manner, higher yields and higher batch-to-batch consistency in the production of nanostructures can be achieved.

16 Claims, 12 Drawing Sheets

(A) (B)

PRODUCTION OF NANOSTRUCTURES

CROSS REFERENCE TO RELATED APPLICATIONS

This application claims the benefit of U.S. Provisional Application No. 61/502,186, filed on Jun. 28, 2011, U.S. Provisional Application No. 61/548,012, filed on Oct. 17, 2011, U.S. Provisional Application No. 61/564,233, filed on Nov. 28, 2011, and U.S. Provisional Application No. 61/598,183, filed on Feb. 13, 2012, the disclosures of which are incorporated herein by reference in their entireties.

FIELD OF THE INVENTION

The invention relates generally to nanostructures. More particularly, the invention relates to the production of nanostructures, such as nanowires.

BACKGROUND

Nano-sized materials (or nanostructures) can differ markedly from their analogous bulk materials. In particular, physical, chemical, electrical, and other properties of nanostructures can correlate with their morphology, including shape and size. As a result, efforts have been made to develop methods for producing nanostructures with controllable morphology, hence tailoring their properties. Unfortunately, existing methods can suffer from poor yields and from batch-to-batch variability in nanostructure morphology.

It is against this background that a need arose to develop the embodiments described herein.

SUMMARY

Nanostructure morphologies are controlled by incorporating an agitation mechanism that imparts low shear mixing along with purification of a resulting nanostructure product to effectively remove agglomerates and other components of a reaction mixture. In such manner, higher yields and higher batch-to-batch consistency in the production of nanostructures can be achieved.

One aspect of this disclosure relates to a system for production of nanowires. In one embodiment, the system includes (a) a reactor configured to house a nanowire synthesis solution; and an agitation mechanism connected to the reactor and configured to impart low shear mixing of the solution.

In some implementations, the low shear mixing of the solution is characterized as laminar. In some implementations, the low shear mixing of the solution is characterized by a Reynolds number below a turbulent threshold. In some implementations, the agitation mechanism is configured to introduce a flow of a fluid into the reactor. In some implementations, the fluid is a gas. In some implementations, the agitation mechanism includes a conditioning unit to pre-condition the fluid prior to introduction into the reactor. In some implementations, the agitation mechanism is configured to circulate beads dispersed in the solution. In some implementations, the agitation mechanism includes a perforated structure, and the agitation mechanism is configured to impart a flow of the solution through holes in the perforated structure. In some implementations, at least one of holes is at least 0.3 cm in diameter. In some implementations, the perforated structure is a perforated disk, and the agitation mechanism is configured to impart a reciprocating motion to the perforated disk. In some implementations, the reciprocating motion has a frequency of 0.01 to 10 cycles per second. In some implementations, the agitation mechanism is configured to retain the perforated disk below a surface of the solution throughout the reciprocating motion. In some implementations, the reactor has a diameter d, and the perforated disk has a diameter in a range of 0.5 d to 0.95 d. In some implementations, the agitation mechanism includes a shaft connected to the perforated disk, and the shaft has a diameter in a range of 0.02 d to 0.1 d. In some implementations, the perforated structure is a perforated paddle, and the agitation mechanism is configured to rotate the perforated paddle.

Another aspect of this disclosure relates to a method for production of nanowires. In one embodiment, the method includes (a) providing a nanowire synthesis solution; and (b) conducting a reaction of the solution under low shear mixing to produce a first batch of nanowires, the first batch of nanowires having a first value of a morphological characteristic selected from an average aspect ratio, an average length, and an average diameter.

In some implementations, the method includes repeating operations (a) and (b) to produce subsequent batches of nanowires having respective values of the morphological characteristic, and a standard deviation of the values across all of the batches is no greater than 25% relative to an average value across all of the batches. In some implementations, the standard deviation is no greater than 15% relative to the average value across all of the batches. In some implementations, the standard deviation is no greater than 10% relative to the average value across all of the batches. In some implementations, a total number of the batches is at least 5. In some implementations, conducting the reaction of the solution in (b) includes agitating the solution by introducing a flow of a gas. In some implementations, conducting the reaction of the solution in (b) includes agitating the solution by circulating beads dispersed in the solution. In some implementations, conducting the reaction of the solution in (b) includes agitating the solution by imparting a flow of the solution through holes in a perforated structure.

Another aspect of this disclosure relates to a method for purifying a nanowire dispersion. In one embodiment, the method includes (a) transferring the dispersion from an original container to multiple first containers; and (b) after passage of a sufficient amount of time to allow agglomerates to settle to bottoms of the first containers, transferring top portions of contents of the first containers to at least one second container.

In some implementations, transferring the top portions of the contents of the first containers includes transferring at least a top one-third of the content of each of the first containers. In some implementations, transferring the top portions of the contents of the first containers includes transferring at least a top two-thirds of the content of each of the first containers. In some implementations, transferring the top portions of the contents of the first containers includes transferring at least a top five-sixths of the content of each of the first containers.

Another aspect of this disclosure relates to a composition of matter. In one embodiment, the composition of matter includes a dispersion containing nanowires suspended in a solvent, where the dispersion is from a given batch of dispersions in a group of batches, where a coefficient of variation for an average aspect ratio, average length, or average diameter of the nanowires in the dispersion from the given batch is no greater than about 30% relative to a corresponding average value of aspect ratio, length or diameter for nanowires taken across two or more different batches in the group of batches, such as no greater than about 25%, no greater than about 20%, no greater than about 15%, no greater than about 10%, no greater than about 5%, no greater than about 2%, or no greater than about 1%. The number of batches used for determining the coefficient of variation can be at least 2 batches, at least 3 batches, at least 4 batches, at least 5 batches, at least 10 batches, at least 15 batches, or at least 20 batches. The nanowires in the dispersion can be silver nanowires.

In another embodiment, the composition of matter includes a dispersion containing nanowires suspended in a solvent, wherein the dispersion is from a given batch of dispersions in a group of batches, where the dispersion is characterized by a substantial absence of agglomerates having a size of about 100 μm or greater, such as a substantial absence of agglomerates having a size of about 90 μm or greater, a substantial absence of agglomerates having a size of about 80 μm or greater, a substantial absence of agglomerates having a size of about 70 μm or greater, a substantial absence of agglomerates having a size of about 60 μm or greater, a substantial absence of agglomerates having a size of about 50 μm or greater, or a substantial absence of agglomerates having a size of about 40 μm or greater. The nanowires in the dispersion can be silver nanowires.

Other aspects and embodiments of the invention are also contemplated. The foregoing summary and the following detailed description are not meant to restrict the invention to any particular embodiment but are merely meant to describe some embodiments of the invention.

BRIEF DESCRIPTION OF THE DRAWINGS

For a better understanding of the nature and objects of some embodiments of the invention, reference should be made to the following detailed description taken in conjunction with the accompanying drawings.

DETAILED DESCRIPTION

Definitions

Figure 1:
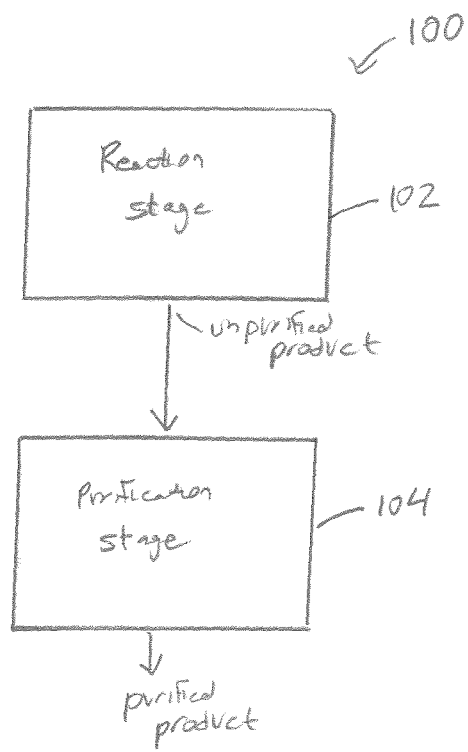
FIG. 1 shows a system for the production of nanowires, according to an embodiment of the invention.

The following definitions apply to some of the aspects described with regard to some embodiments of the invention. These definitions may likewise be expanded upon herein.

As used herein, the singular terms "a," "an," and "the" include plural referents unless the context clearly dictates otherwise. Thus, for example, reference to an object can include multiple objects unless the context clearly dictates otherwise.

As used herein, the term "set" refers to a collection of one or more objects. Thus, for example, a set of objects can include a single object or multiple objects. Objects of a set can also be referred to as members of the set. Objects of a set can be the same or different. In some instances, objects of a set can share one or more common characteristics.

As used herein, the term "adjacent" refers to being near or adjoining Adjacent objects can be spaced apart from one another or can be in actual or direct contact with one another. In some instances, adjacent objects can be connected to one another or can be formed integrally with one another.

As used herein, the terms "connect," "connected," and "connection" refer to an operational coupling or linking Connected objects can be directly coupled to one another or can be indirectly coupled to one another, such as via another set of objects.

As used herein, the terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels of the manufacturing methods described herein.

As used herein, the terms "optional" and "optionally" mean that the subsequently described event or circumstance may or may not occur and that the description includes instances where the event or circumstance occurs and instances in which it does not.

As used herein, relative terms, such as "inner," "interior," "outer," "exterior," "top," "bottom," "front," "rear," "back," "upper," "upwardly," "lower," "downwardly," "vertical," "vertically," "lateral," "laterally," "above," and "below," refer to an orientation of a set of objects with respect to one another, such as in accordance with the drawings, but do not require a particular orientation of those objects during manufacturing or use.

As used herein, the term "nanometer range" or "nm range" refers to a range of dimensions from about 1 nm to about 1 micrometer ("μm"). The nm range includes the "lower nm range," which refers to a range of dimensions from about 1 nm to about 10 nm, the "middle nm range," which refers to a range of dimensions from about 10 nm to about 100 nm, and the "upper nm range," which refers to a range of dimensions from about 100 nm to about 1 μm.

As used herein, the term "micrometer range" or "μm range" refers to a range of dimensions from about 1 μm to about 1 millimeter ("mm"). The μm range includes the "lower μm range," which refers to a range of dimensions from about 1 μm to about 10 μm, the "middle μm range," which refers to a range of dimensions from about 10 μm to about 100 μm, and the "upper μm range," which refers to a range of dimensions from about 100 μm to about 1 mm.

As used herein, the term "aspect ratio" refers to a ratio of a largest dimension or extent of an object and an average of remaining dimensions or extents of the object, where the remaining dimensions are orthogonal with respect to one another and with respect to the largest dimension. In some instances, remaining dimensions of an object can be substantially the same, and an average of the remaining dimensions can substantially correspond to either of the remaining dimensions. For example, an aspect ratio of a cylinder refers to a ratio of a length of the cylinder and a cross-sectional diameter of the cylinder. As another example, an aspect ratio of a spheroid refers to a ratio of a major axis of the spheroid and a minor axis of the spheroid.

As used herein, the term "nano-sized" object refers to an object that has at least one dimension in the nm range. A nano-sized object can have any of a wide variety of shapes, and can be formed of a wide variety of materials. Examples of nano-sized objects include nanowires, nanotubes, nanoplatelets, nanoparticles, and other nanostructures.

As used herein, the term "nanowire" refers to an elongated, nano-sized object that is substantially solid. Typically, a nanowire has a lateral dimension (e.g., a cross-sectional dimension in the form of a width, a diameter, or a width or diameter that represents an average across orthogonal directions) in the nm range, a longitudinal dimension (e.g., a length) in the μm range, and an aspect ratio that is about 3 or greater.

As used herein, the term "nanoplatelet" refers to a planar-like nano-sized object that is substantially solid.

As used herein, the term "nanotube" refers to an elongated, hollow, nano-sized object. Typically, a nanotube has a lateral dimension (e.g., a cross-sectional dimension in the form of a width, an outer diameter, or a width or outer diameter that represents an average across orthogonal directions) in the nm range, a longitudinal dimension (e.g., a length) in the μm range, and an aspect ratio that is about 3 or greater.

As used herein, the term "nanoparticle" refers to a spheroidal, nano-sized object. Typically, each dimension (e.g., a cross-sectional dimension in the form of a width, a diameter, or a width or diameter that represents an average across orthogonal directions) of a nanoparticle is in the nm range, and the nanoparticle has an aspect ratio that is less than about 3, such as about 1.

As used herein, the term "micron-sized" object refers to an object that has at least one dimension in the μm range. Typically, each dimension of a micron-sized object is in the μm range or beyond the μm range. A micron-sized object can have any of a wide variety of shapes, and can be formed of a wide variety of materials. Examples of micron-sized additives include microwires, microtubes, microparticles, and other microstructures.

As used herein, the term "microwire" refers to an elongated, micron-sized object that is substantially solid. Typically, a microwire has a lateral dimension (e.g., a cross-sectional dimension in the form of a width, a diameter, or a width or diameter that represents an average across orthogonal directions) in the μm range and an aspect ratio that is about 3 or greater.

As used herein, the term "microtube" refers to an elongated, hollow, micron-sized object. Typically, a microtube has a lateral dimension (e.g., a cross-sectional dimension in the form of a width, an outer diameter, or a width or outer diameter that represents an average across orthogonal directions) in the μm range and an aspect ratio that is about 3 or greater.

As used herein, the term "microparticle" refers to a spheroidal, micron-sized object. Typically, each dimension (e.g., a cross-sectional dimension in the form of a width, a diameter, or a width or diameter that represents an average across orthogonal directions) of a microparticle is in the μm range, and the microparticle has an aspect ratio that is less than about 3, such as about 1.

Production of Nanowires

Embodiments described herein relate to the production of nanostructures with controllable morphologies. Examples of nanostructures include nanowires, which can be formed of a variety of materials, including metals (e.g., silver (or Ag), nickel (or Ni), platinum (or Pt), platinum (or Pt), copper (or Cu), and gold (or Au)), semiconductors (e.g., silicon (or Si), indium phosphide (or InP), gallium nitride (or GaN)), conducting oxides and chalcogenides that are optionally doped and transparent (e.g., metal oxides and chalcogenides that are optionally doped and transparent), electrically conductive polymers (e.g., polyaniline, poly(acetylene), poly(pyrrole), poly(thiophene), poly(p-phenylene sulfide), poly(p-phenylene vinylene), poly(3-alkylthiophene), olyindole, polypyrene, polycarbazole, polyazulene, polyazepine, poly(fluorene), polynaphthalene, melanins, poly(3,4-ethylenedioxythiophene) (or PEDOT), poly(styrenesulfonate) (or PSS), PEDOT-PSS, PEDOT-polymethacrylic acid, poly(3-hexylthiophene), poly(3-octylthiophene), poly(C-61-butyric acid-methyl ester), and poly[2-methoxy-5-(2'-ethyl-hexyloxy)-1,4-phenylene vinylene]), insulators (e.g., silica ($SiO_2$) and titania (or $TiO_2$)), and any combination thereof. Nanowires can have a core-shell configuration or a core-multi-shell configuration.

In some embodiments, nanowire morphologies are controlled by incorporating an agitation mechanism that imparts low shear mixing along with purification of a resulting nanowire product to effectively remove agglomerates and other components of a reaction mixture. In such manner, higher yields and higher batch-to-batch consistency in the production of nanowires can be achieved. Although certain embodiments are described in the context of nanowires, additional embodiments can be implemented for the production of other types of nanostructures with controllable morphologies, such as other types of nanostructures that are generally elongated and having an aspect ratio of about 3 or greater. Further embodiments can be implemented for the production of micron-sized structures (or microstructures) with controllable morphologies, such as microstructures that are generally elongated and having an aspect ratio of about 3 or greater.

By way of overview, FIG. 1 shows a system 100 for the production of nanowires, such as metal nanowires. The system 100 includes a reaction stage 102 and a purification stage 104, which is connected to the reaction stage 102. Likewise, FIG. 1 can be viewed as a flowchart of a process for the production of nanowires, with the reaction stage 102 and the purification stage 104 corresponding to different operational stages of the process.

Referring to FIG. 1, the reaction stage 102 is implemented to perform a solution synthesis reaction for the production of nanowires. In a solution synthesis reaction, nanowires can be grown from a reaction mixture including a solvent, a reagent including a material forming the nanowires, and a templating agent. The reaction mixture can be, for example, a nanowire synthesis solution. As the reaction mixture is heated, the templating agent (e.g., a capping agent) can bind to a lateral crystal face of a nanowire seed, impeding growth in the lateral directions and, thereby, inducing preferentially growth along a longitudinal direction that is substantially perpendicular to the lateral crystal face. An example of a solution synthesis reaction is sometimes referred to as the polyol process for the production of metal nanowires, where a capping agent can bind to the {1 0 0} face of the 5-fold twinned seed structure, allowing growth on the {1 1 1} face. Other types of solution synthesis reactions are contemplated.

In the case of metal nanowires, examples of suitable metal-containing reagents include metal salts, such as silver nitrate (or $AgNO_3$), silver acetate (or $(CH_3COO)_2Ag$), trifluorosilver acetate (or $(CF_3COO)_2Ag$), silver phosphate (or $Ag_3PO_4$), silver perchlorate (or $AgClO_4$), gold perchlorate (or $Au(ClO_4)_3$), chloroauric acid (or $HAuCl_4$), palladium (II)

chloride (or PdCl$_2$), palladium acetylacetonate (or Pd(C$_5$H$_7$O$_2$)$_2$), palladium nitrate (or Pd(NO$_3$)$_2$), potassium tetrachloropalladate(II) (or K$_2$PdCl$_4$), platinum (II) chloride (or PtCl$_2$), potassium hexachloroplatinate (or K$_2$PtCl$_6$), chloroplatinic acid (or H$_2$PtCl$_6$), platinum acetylacetonate (or Pt(C$_5$H$_7$O$_2$)$_2$), and any combination thereof. Examples of suitable templating agents (also sometimes referred as "capping agents") include polyvinylpyrrolidone, polyarylamide, polyacrylic, and any combination or copolymer thereof. Examples of suitable solvents include polar solvents in which a metal-containing reagent, a templating agent, and any other reactants or additives are sufficiently soluble. In addition, the solvent can function as a reducing agent to convert the metal-containing reagent to its corresponding elemental metal form. Typically, the reducing solvent includes at least two hydroxyl groups per molecule. Examples of suitable reducing solvents include diols, polyols, glycols, or mixtures thereof. More specifically, the reducing solvent can be, for example, ethylene glycol, 1,2-propylene glycol, 1,3-propylene glycol, glycerin, glycerol, glucose, or any combination thereof. In some embodiments, a reducing solvent having a higher viscosity can mitigate against the formation of agglomerates. For example, compared to ethylene glycol (viscosity of about 1.61×10$^{-2}$ N s/m$^2$ at room temperature), glycerol has a higher viscosity (viscosity of about 1.41 N s/m$^2$ at room temperature), and can be selected as a reducing solvent. Other solvents having a higher viscosity than ethylene glycol can be similarly selected. Additional additives or reactants can be included to increase yield and promote uniformity in nanowire morphology, such as iron salts including iron acetate, iron chloride, iron acetylacetonate in either the +2 or +3 valence, sodium chloride (or NaCl), platinum chloride (or PtCl$_2$), palladium chloride (or PdCl$_2$), quaternary ammonium salts (e.g., cetyltrimethylammonium bromide), and other salts or ionic additives.

At the reaction stage 102 of FIG. 1, various reactants are introduced, combined, and reacted to produce an unpurified product, including nanowires. The reactants can be combined as solutions or in a solid form. The order of introduction of the reactants can be varied as the reactants can be combined in various ways. For example, a metal salt can be incorporated in a solution including the metal salt in a first portion of a reducing solvent, and a templating agent can be incorporated in another solution including the templating agent in a second portion of the reducing solvent. The metal salt solution and the templating agent solution, in some embodiments, can be simultaneously or sequentially added to a third portion of the reducing solvent. This addition can be drop-wise or portion-wise. As another example, the metal salt solution and the templating agent solution can be combined together, and a resulting mixture can be added to the third portion of the reducing solvent. As noted above, either, or both, of the metal salt and the templating agent can be combined in a solid form.

At the purification stage 104 of FIG. 1, the unpurified product from the reaction stage can be purified. Specifically, synthesized nanowires can be separated from other components of a reaction mixture, and then re-dispersed in a suitable solvent to form a nanowire dispersion. If the nanowire dispersion is determined to have an unacceptable level of agglomerates, the nanowire dispersion can be subjected to a procedure for agglomerate removal.

By carrying out the production of nanowires according to FIG. 1, a number of benefits can be attained. For example, a yield of nanowires in the unpurified or purified product can be at least about 80% for small scale reactions (e.g., reaction mixture volume up to about 1 L), such as at least about 85%, at least about 87%, at least about 90%, or at least about 92%, and up to about 95%, up to about 98%, or more, and a yield of nanowires in the unpurified or purified product can be at least about 55% for large scale reactions (e.g., reaction mixture volume greater than about 1 L), such as at least about 60%, at least about 65%, at least about 70%, at least about 75%, or at least about 80%, and up to about 85%, up to about 90%, or more. As used herein, yield of nanowires formed of a material can refer to an amount (e.g., by weight or moles) of the nanowires relative to an amount (e.g., by weight or moles) of the material added to a reaction mixture in the form of a reactant.

As another example, among nanowires in the unpurified or purified product, at least about 30% of the nanowires (e.g., by number) can have an aspect ratio of at least about 50, such as at least about 35%, at least about 40%, at least about 45%, at least about 50%, at least about 55%, at least about 60%, at least about 65%, or at least about 60%, and up to about 80%, up to about 90%, or more. In some implementations, at least about 25% of the nanowires (e.g., by number) can have an aspect ratio of at least about 100, such as at least about 30%, at least about 35%, at least about 40%, at least about 45%, at least about 50%, at least about 55%, at least about 60%, or at least about 65%, and up to about 75%, up to about 85%, or more. In other implementations, at least about 20% of the nanowires (e.g., by number) can have an aspect ratio of at least about 200, such as at least about 25%, at least about 30%, at least about 35%, at least about 40%, at least about 45%, at least about 50%, at least about 55%, or at least about 60%, and up to about 70%, up to about 80%, or more. In other implementations, at least about 20% of the nanowires (e.g., by number) can have an aspect ratio of at least about 400, such as at least about 25%, at least about 30%, at least about 35%, at least about 40%, at least about 45%, at least about 50%, at least about 55%, or at least about 60%, and up to about 70%, up to about 80%, or more.

As another example, among nanowires in the unpurified or purified product, at least about 30% of the nanowires (e.g., by number) can have a length of at least about 10 μm, such as at least about 35%, at least about 40%, at least about 45%, at least about 50%, at least about 55%, at least about 60%, at least about 65%, or at least about 60%, and up to about 80%, up to about 90%, or more. In some implementations, at least about 25% of the nanowires (e.g., by number) can have a length of at least about 20 μm, such as at least about 30%, at least about 35%, at least about 40%, at least about 45%, at least about 50%, at least about 55%, at least about 60%, or at least about 65%, and up to about 75%, up to about 85%, or more. In other implementations, at least about 20% of the nanowires (e.g., by number) can have a length of at least about 30 μm, such as at least about 25%, at least about 30%, at least about 35%, at least about 40%, at least about 45%, at least about 50%, at least about 55%, or at least about 60%, and up to about 70%, up to about 80%, or more.

As another example, among nanowires in the unpurified or purified product, at least about 30% of the nanowires (e.g., by number) can have a diameter no greater than about 100 nm, such as at least about 35%, at least about 40%, at least about 45%, at least about 50%, at least about 55%, at least about 60%, at least about 65%, or at least about 60%, and up to about 80%, up to about 90%, or more. In some implementations, at least about 25% of the nanowires (e.g., by number) can have a diameter no greater than about 60 nm, such as at least about 30%, at least about 35%, at least about 40%, at least about 45%, at least about 50%, at least about 55%, at least about 60%, or at least about 65%, and up to about 75%, up to about 85%, or more. In other implementations, at least about 20% of the nanowires (e.g., by number) can have a diameter no greater than about 40 nm, such as at least about 25%, at least about 30%, at least about 35%, at least about 40%, at least about 45%, at least about 50%, at least about 55%, or at least about 60%, and up to about 70%, up to about 80%, or more.

In terms of batch-to-batch consistency across different batches of the unpurified or purified product (using substantially identical manufacturing conditions), a value corresponding to an average aspect ratio of nanowires in each batch can be obtained, and a coefficient of variation (e.g., standard deviation divided by average or mean across the batches) in aspect ratio values across the batches can be no greater than about 30%, such as no greater than about 25%, no greater than about 20%, no greater than about 15%, no greater than about 10%, or no greater than about 5%, and down to about 2%, down to about 1%, or less. The number of batches used for determining batch-to-batch consistency can be at least 2, such as at least 3, at least 4, at least 5, at least 10, at least 15, or at least 20.

Also, in terms of batch-to-batch consistency across different batches of the unpurified or purified product (using substantially identical manufacturing conditions), a value corresponding to an average length of nanowires in each batch can be obtained, and a coefficient of variation (e.g., standard deviation divided by average or mean across the batches) in values across the batches can be no greater than about 30% relative to an average value across the batches, such as no greater than about 25%, no greater than about 20%, no greater than about 15%, no greater than about 10%, or no greater than about 5%, and down to about 2%, down to about 1%, or less. The number of batches used for determining batch-to-batch consistency can be at least 2, such as at least 3, at least 4, at least 5, at least 10, at least 15, or at least 20.

And, in terms of batch-to-batch consistency across different batches of the unpurified or purified product (using substantially identical manufacturing conditions), a value corresponding to an average diameter of nanowires in each batch can be obtained, and a coefficient of variation (e.g., standard deviation divided by average or mean across the batches) in values across the batches can be no greater than about 30% relative to an average value across the batches, such as no greater than about 25%, no greater than about 20%, no greater than about 15%, no greater than about 10%, or no greater than about 5%, and down to about 2%, down to about 1%, or less. The number of batches used for determining batch-to-batch consistency can be at least 2, such as at least 3, at least 4, at least 5, at least 10, at least 15, or at least 20.

Further aspects of the reaction stage 102 and the purification stage 104 are described in the following sections.

Reaction—Low Shear Mixing

At the reaction stage 102 of FIG. 1, various reactants are introduced, combined, and reacted in a reactor to produce nanostructures, including nanowires. In some embodiments, the reactor incorporates an agitation mechanism, which is connected to the reactor and imparts low shear mixing of a reaction mixture that is housed within the reactor.

In some embodiments, a desirable agitation mechanism strikes a balance between inadequate mixing and excessive mixing. Growth of nanowires of a desirable morphology, such as having a greater length, a smaller diameter, and a higher aspect ratio, can be promoted by flow of reactants towards or adjacent to sites of growth. The absence of mixing (or inadequate mixing) can result in inadequate flow of reactants as well as reaction environments that vary from location to location in a reaction mixture, such as in terms of temperature gradients or other variations that impact a rate of growth. This results in nanowires with non-uniform morphologies within a particular batch of a reaction mixture and variations in nanowire morphologies from batch-to-batch of different reaction mixtures. Also, a combination of a molten or softened templating agent and the presence of growing fibrous nanowires can lead to the formation of clumps of material that include agglomerated nanowires and other nanostructures that cannot be readily salvaged, leading to low yields.

Excessive mixing also can interfere with nanowire formation. Specifically, excess mixing can create high liquid shear in a reaction mixture. In some instances, shear in a flowing fluid can be visualized in terms of layers of the fluid moving at different velocities, and shear can be related to a velocity gradient in a direction substantially perpendicular to the layers. High shear can result in reaction environments that vary from location to location in a reaction mixture, such as in terms of temperature gradients or other variations across the layers of the fluid moving at different velocities. This results in non-uniform nanowire morphologies within a particular batch and across different batches. Also, excess mixing can create turbulent flow in the reaction mixture and lead to the formation of vortices, which can cause entanglement of nanowires into agglomerates that cannot be readily salvaged, leading to low yields. This is particularly a problem when the nanowires have higher aspect ratios or grow longer. Agglomerated nanowires can be difficult to separate back into dispersed nanowires, as additional agitation or even ultrasonication can worsen the agglomeration or even destroy individual nanowires. Agglomerated nanowires can form clumps and destabilize and precipitate from a mixture, which can subsequently clog coating or printing machinery, cause streaking or other visible defects on a coating, and impede uniformity and transparency of a resulting film.

In some embodiments, a desirable agitation mechanism can be characterized in terms of an effectiveness of mixing, a Reynolds number, or both. An effectiveness of mixing can be expressed in terms of a number of mixing cycles (e.g., impeller rotations, grape press oscillations, or other round trip movements of an agitation mechanism) to reach a desired level of homogeneity or uniformity in a reaction mixture. A desired level of homogeneity can be measured using a set of sensors or probes to detect temperature gradients, ion gradients, or other variations across different locations in a reaction mixture. For example, a desired level of homogeneity can be attained when a coefficient of variation (standard deviation divided by mean or average) across the sensors is no greater than about 30% relative to an average temperature value across the sensors, such as no greater than about 25%, no greater than about 20%, no greater than about 15%, no greater than about 10%, or no greater than about 5%. Starting from an initial condition of a reaction mixture (e.g., upon introducing various reactants and prior to activating an agitation mechanism), an effectiveness of mixing, in some embodiments, can be no greater than about 100 mixing cycles, such as no greater than about 90 mixing cycles, no greater than about 80 mixing cycles, no greater than about 70 mixing cycles, no greater than about 60 mixing cycles, no greater than about 50 mixing cycles, no greater than about 40 mixing cycles, no greater than about 30 mixing cycles, no greater than about 25 mixing cycles, no greater than about 20 mixing cycles, or no greater than about 10 mixing cycles, and down to about 5 mixing cycles or less. In other embodiments, an effectiveness of mixing can be in the range of about 80 to about 100 mixing cycles, in the range of about 60 to about 80 mixing cycles, in the range of about 40 to about 60 mixing cycles, in the range of about 20 to about 40 mixing cycles, or in the range of about 5 to about 20 mixing cycles. In some embodiments, a mixing rate (e.g., a frequency of impeller rotations, grape press oscillations, or other round trip movements of an agitation mechanism) is in the range of about 0.05 cycles per second to about 20 cycles per second, such as from about 0.1 cycles per second to about 15 cycles per second, from about 0.1 cycles per second to about 10 cycles per second, from about 0.1 cycles per second to about 5 cycles per second, from about 0.2 cycles per second to about 2 cycles per second.

As noted above, high shear in mixing can lead to vortexing, which, in turn, can be related to a degree to which fluid flow in a reactor is turbulent. In some embodiments, a degree to which mixing is laminar or turbulent can be expressed in terms of a dimensionless Reynolds number that characterizes a mixing operation. By way of example, in the case of a cylindrical reactor mixed by a central rotating mechanism (e.g., an impeller), a Reynolds number can be expressed as: $Re=(\rho ND^2)/\mu$, $\rho$ is a density of a reaction medium, $\mu$ is a dynamic viscosity of the reaction medium, N is a rotational speed of the rotating mechanism, and D is a characteristic dimension of the rotating mechanism (e.g., a diameter of an impeller). For this case, mixing is turbulent for values of Re at or above 10,000. More generally, mixing can be characterized as laminar when values of Re is at or below a laminar threshold $Re_{laminar}$, can be characterized as turbulent (e.g., fully turbulent) when values of Re is at or above a turbulent threshold $Re_{turbulent}$, and can be characterized as in a transition regime (e.g., having characteristics in between laminar and turbulent) when values of Re is between $Re_{laminar}$ and $Re_{turbulent}$. In some embodiments, low shear mixing can be characterized by values of Re below $Re_{turbulent}$, such as at or below $Re_{laminar}$ or between $Re_{laminar}$ and $Re_{turbulent}$. In the case of a cylindrical reactor mixed by a central rotating mechanism, low shear mixing can be characterized by values of Re below 10,000. Values for $Re_{laminar}$ and $Re_{turbulent}$ can be obtained through experimental measurements or theoretically (e.g., through computer simulations) for particular implementations of a reactor, a reaction medium, and an agitation mechanism.

The following describes various embodiments of reactors incorporating agitation mechanisms that can agitate a reaction mixture, while mitigating against high shear, and while imparting adequate mixing to result in nanowires with higher yield and with greater uniformity in morphology. The agitation mechanisms can mitigate against the presence of clumps and agglomerates in the reaction mixture, which can lower yields. Furthermore, by mitigating against clumps and agglomerates, reactions can be carried out for extended periods of time, thereby resulting in longer nanowires that can be beneficial for certain applications. Generally, with high shear mixing, longer nanowires can tend to clump, resulting in lower yield.

Figure 2:
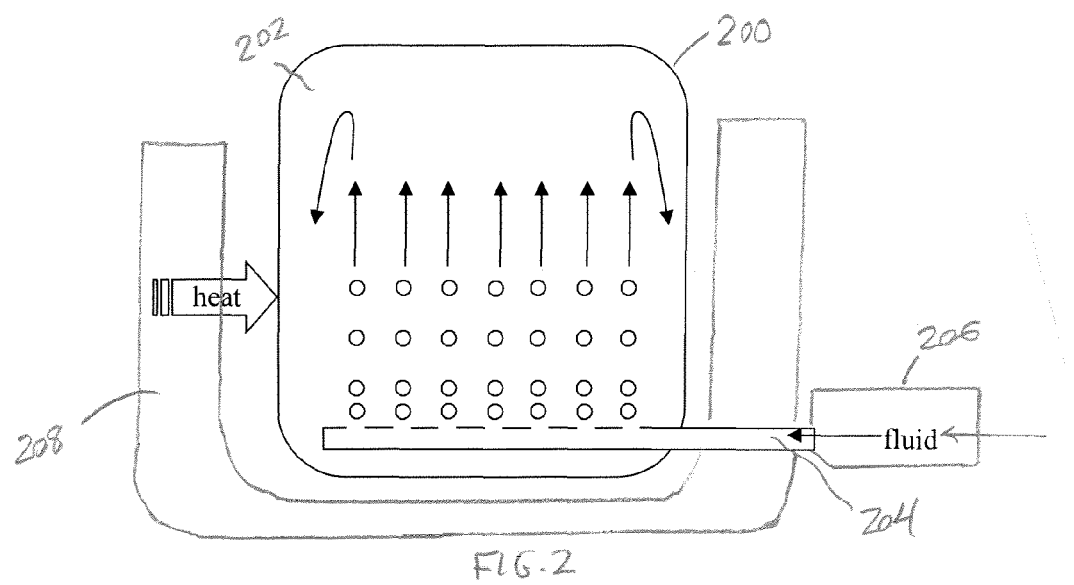
FIG. 2 through FIG. 6 show reactors and agitation mechanisms implemented in accordance with various embodiments of the invention.

Referring to an embodiment of FIG. 2, at any stage of, or substantially throughout, a solution synthesis reaction, a substantially evenly distributed fluid can be introduced into a reactor 200 used to form nanowires, such as in the form of an aggressive gas flow or by bubbling the gas. The gas can be introduced in such a manner to result in adequate mixing of a reaction mixture 202, while mitigating against high shear. By way of example, a solution for forming silver nanowires can include ethylene glycol as a reducing solvent, silver nitrate to provide silver for the nanowires, polyvinylpyrrolidone as a templating agent, along with other additives such as iron salt and NaCl. The solution can be held at some temperature elevated from room temperature, such as in the range of about 70° C. to about 140° C. or the range of about 80° C. to about 120° C. Through the introduction of the gas, the solution can be agitated in a manner that reduces liquid shear, while attaining a high effectiveness of mixing.

As shown in FIG. 2, the gas can be introduced adjacent to the bottom of the reactor 200, through a manifold 204 or another gas introduction mechanism. The gas additionally or alternatively can be introduced at other locations, such as adjacent to the middle of the reactor 200, adjacent to the top of the reactor 200, or throughout a volume of the reactor 200 using an appropriate manifold. The gas can be air, compressed dry air, or a relatively inert gas such as nitrogen, argon, hydrogen, forming gas, carbon dioxide, or the like. Prior to introduction, the gas can be pre-conditioned using a gas conditioning unit 206 at a desired temperature, a desired humidity, or both. For example, the gas can be conditioned at about 130° C. prior to introduction into the reactor 200 that is itself held at about 130° C. This conditioning can be used to avoid an undesirable change in a reaction temperature due to introduction of the gas. More generally, the gas can be conditioned at a temperature that is within about 30° C. of a temperature at which the reactor 200 is held, such as within about 25° C., within about 20° C., within about 15° C., within about 10° C., or within about 5° C. In another implementation, the gas, which is conditioned at about room temperature, can be introduced into the reactor 200 held at an elevated temperature to affect a cooling and simultaneous mixing or agitation of the reaction mixture 202. In another implementation, liquid nitrogen at about −196° C. can be introduced into the reactor 200 held at about 130° C. to produce rapid cooling and mixing. In another implementation, sublimating dry ice can be introduced (e.g., solid carbon dioxide). Nitrogen gas or argon gas introduced into the reactor 200 also can allow for a decreased level of oxidation or other undesired side-reactions involving growing nanowires. Hydrogen or forming gas can be introduced to aid in reduction of metal, such as silver precursors to zero valent metal.

Still referring to FIG. 2, the reactor 200 is heated through a heating mechanism 208 that at least partially surrounds the bottom and sidewalls of the reactor 200. In the embodiment of FIG. 2, the heating mechanism 208 is implemented as a heating jacket that can provide uniform heating of the reactor 200 through both the bottom and the sidewalls of the reactor 200. The use of the heating jacket mitigates against undesired quenching by cold sidewalls of the reactor 200, which otherwise can lead to entanglement of nanowires and the formation of agglomerates of nanowires.

Figure 3:
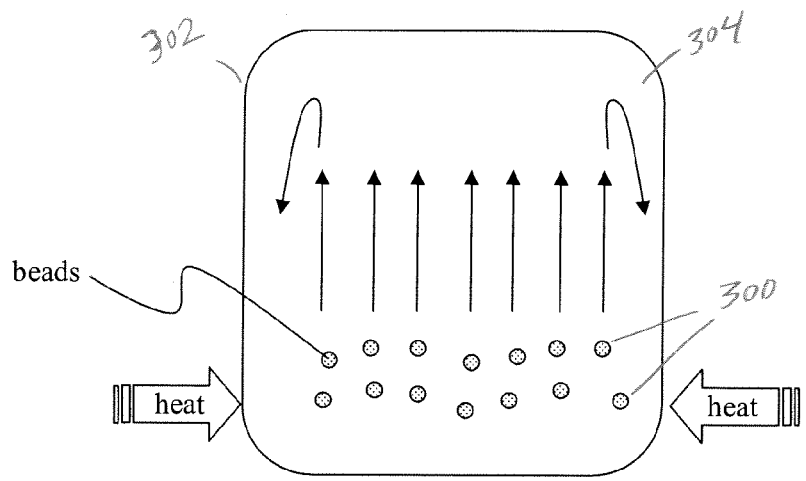

In another embodiment shown in FIG. 3, beads 300 can be included in a reactor 302, and can be dispersed in a reaction mixture 304. The beads 300 can be used in addition to, or instead of, a gas of FIG. 2, with the beads 300 circulating in the reaction mixture 304 by thermal convection. Convection can refers to the rising and sinking of a fluid due to heating and cooling. In FIG. 3, the arrows show rising and subsequent falling motion of the reaction mixture 304 due to convection. The reaction mixture 304 that is heated adjacent to the bottom of the reactor 302 becomes lighter and rises to where it can eventually cool and subsequently sink. The beads 300, which are moved by convention, can induce agitation of the reaction mixture 304, and can mitigate against high shear by interrupting any developing shear fields.

The beads 300 can be formed of any of various suitable materials, such as a glass, quartz, silicon, yttrium-stabilized zirconia (or YTZ), a polymer (e.g., polytetrafluoroethylene (or PTFE or Teflon), fluorinated ethylene propylene, ethylene tetrafluoroethylene, another fluoropolymer, or polypropylene), steel, silicon carbide, tungsten carbide, an inert material, and any material with surface embedded catalyst or chemical additives. The presence of the beads 300 can enhance homogenized mixing while interrupting the development of high liquid shear areas. In some implementations, the beads 300 can be conditioned at a lower temperature, and can be added into the reaction mixture 304 to cool or quench the reaction.

Figure 4:
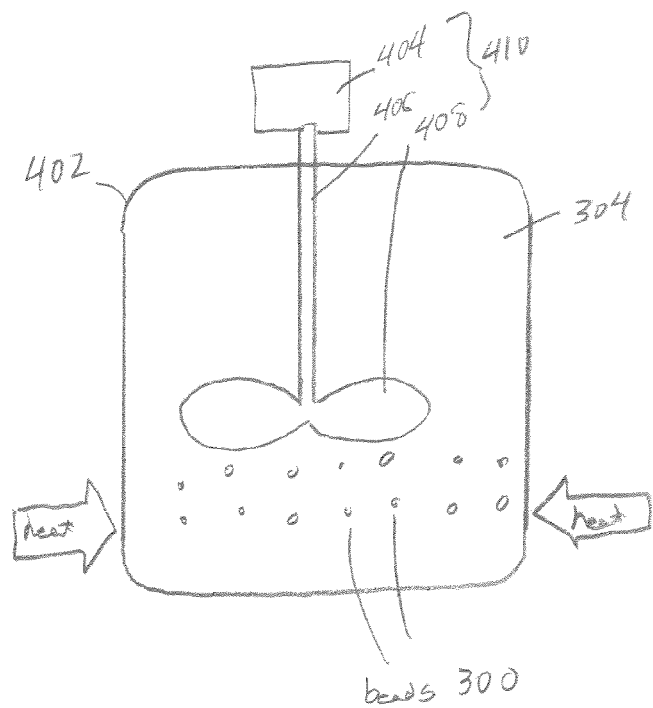

In the embodiment of FIG. 3, an impeller is omitted, and the beads 300 can circulate by thermal convection alone. Alternatively, in another embodiment of a reactor 402 shown in FIG. 4, thermal convection can be combined with an impeller 410 to impart mixing and interrupt shear fields. The impeller 410 includes a set of paddles 408, which are connected to a motor 404 or other drive unit through a shaft 406. The impeller 410 can be operated under conditions of low shear mixing, which can be characterized by values of Re below 10,000. Other aspects of the reactor 402 can be similar implemented as the reactor 302 of FIG. 3, and those aspects are not repeated. In other embodiments, either, or both, convection and an impeller can be combined with air bubbling to achieve low shear mixing. Moreover, any one or more of convection, an impeller, and air bubbling can be combined with another agitation mechanism, such as a grape press described below. Furthermore, any one or more of the agitation mechanisms can be used in combination with a heating jacket that can provide uniform heating.

In other embodiments, mixing of a reaction mixture includes flowing the reaction mixture through apertures, holes, spaces, or gaps in or around a perforated structure, which can be part of a reciprocating mechanism that can be likened to a grape press. The perforated structure can be moved relative to the reaction mixture as fluid flows through the holes, or the reaction mixture can be moved relative to the perforated structure to achieve a similar result. In some cases, the perforated structure can be lowered and raised, or reciprocated using a screw, a continuous screw, a horizontal screw, a hydraulic mechanism, or another mechanical mechanism. In some cases, a stirring device includes a ferromagnetic structure coated with a fluoropolymer with perforation of holes in the fluoropolymer, and the the ferromagnetic structure is mechanically translated or rotated relative to a reaction mixture by applied dynamic magnetic fields.

Figure 5A:
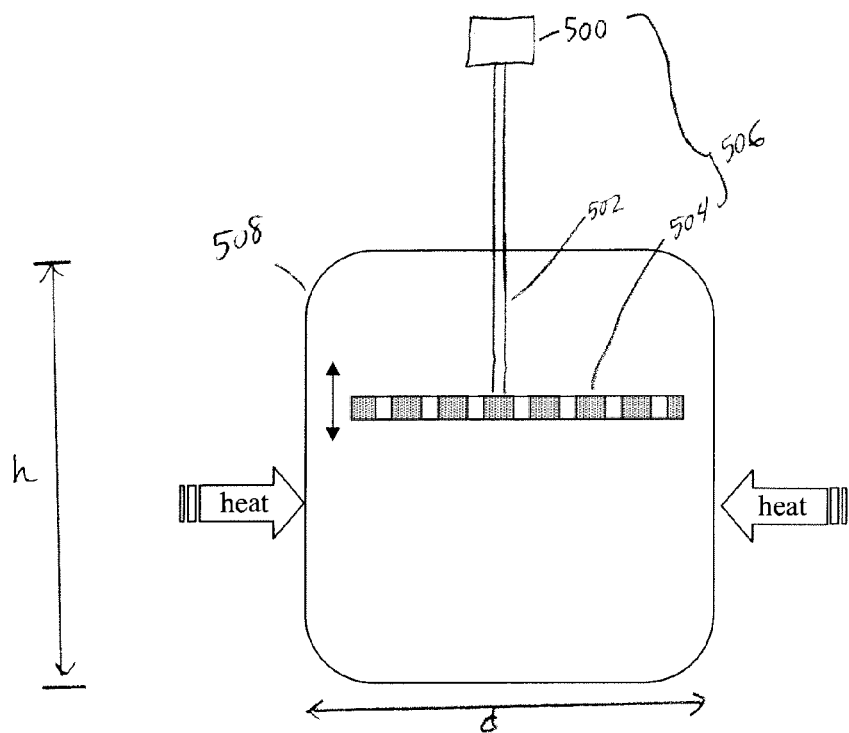

As shown in an embodiment of a reactor 508 in FIG. 5A, a grape press mechanism 506 includes a perforated plate 504 that is driven in an up-and-down, reciprocating motion at a particular frequency. The perforated plate 504 is connected to a motor 500 or other drive unit through a shaft 502. The grape press mechanism 506 can be operated under conditions of low shear mixing, which can be characterized by values of Re below $Re_{turbulent}$. The oscillation frequency, size of the plate 504, amount of holes and size of holes of the grape press mechanism 506 can be adjusted to tune an effectiveness of mixing and a rate of mixing.

Referring to FIG. 5A, the reactor 508 has a width d (e.g., a width or diameter of an internal compartment) and a height h (e.g., a height of an internal compartment), and the perforated plate 504 can be, for example, a disk formed of, or coated with, a fluoropolymer, a polyimide, or other suitably inert material, with a width (e.g., a diameter) in the range of about 0.01 d to about 0.99 d, such as from about 0.4 d to about 0.99 d, from about 0.4 d to about 0.9 d, from about 0.5 d to about 0.95 d, from about 0.5 d to about 0.8 d, or from about 0.6 d to about 0.95 d. In some cases, the disk or any other part of the agitating mechanism includes a ferromagnetic material, and can be mechanically translated or rotated relative to the reaction mixture by applied dynamic magnetic fields. The perforated plate 504 is connected to the shaft 502 with a width (e.g., a diameter) in the range of about 0.01 d to about 0.8 d, such as from about 0.01 d to about 0.3 d, from about 0.01 d to about 0.1 d, from about 0.02 d to about 0.1 d, or from about 0.02 d to about 0.05 d, and a length>h. The perforated plate 504 can include a sufficient number of holes of at least about 0.3 cm or at least about 0.5 cm in width (e.g., diameter such as up to about 1 cm or more) to make up from about 5% to about 90% of an area of the perforated plate 504, such as from about 10% to about 80%, from about 20% to about 70% or from about 30% to about 70%. For example, the holes can have widths in the range of about 0.3 cm to about 0.6 cm, such as from about 0.3 cm to about 0.5 cm, from about 0.3 cm to about 0.4 cm, from about 0.4 cm to about 0.5 cm, from about 0.5 cm to about 0.6 cm, from about 0.6 cm to about 0.7 cm, from about 0.7 cm to about 0.8 cm, from about 0.8 cm to about 0.9 cm, or from about 0.9 com to about 1 cm. To mitigate against clogging of the holes, widths of the holes can be at least 10 times, such as at least 100 times or at least 1,000 times, larger than an expected average nanowire length or an expected longest nanowire length. Also, to facilitate fluid flow through the holes without high shear, at least one of the holes can be tapered or otherwise implemented with smooth or rounded surfaces as shown in FIG. 5C. Tapering can occur from both the top and the bottom of the perforated plate 504 as shown in the top panel of FIG. 5C, or from the top towards the bottom as shown in the bottom panel of FIG. 5C. Tapering also can occur from the bottom towards the top of the perforated plate 504. Referring back to FIG. 5A, the shaft 502 is connected to the motor 500 that moves the perforated plate 504 at a frequency in the range of about 0.01 cycles per second to about 20 cycles per second, such as from about 0.01 cycles per second to about 10 cycles per second, from about 0.1 cycles per second to about 20 cycles per second, from about 0.1 cycles per second to about 5 cycles per second, or from about 0.2 cycles per second to about 2 cycles per second, starting adjacent to the bottom of the reactor 508 (e.g., 0-0.3 h or 0-0.2 h from the bottom) up to just below a top surface of a reaction mixture.

Figure 5B:
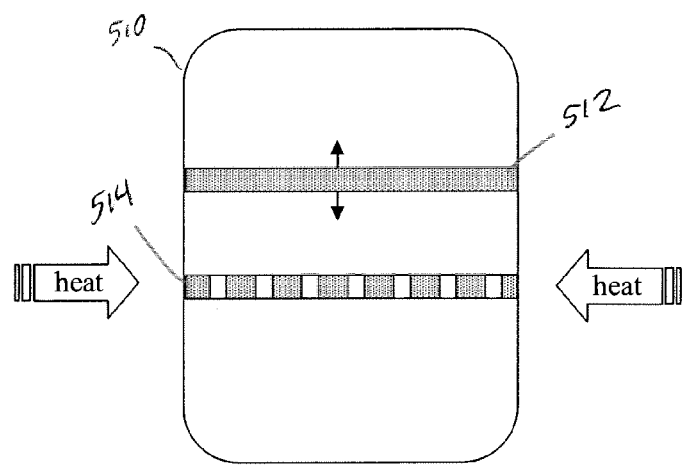
Figure 5C:
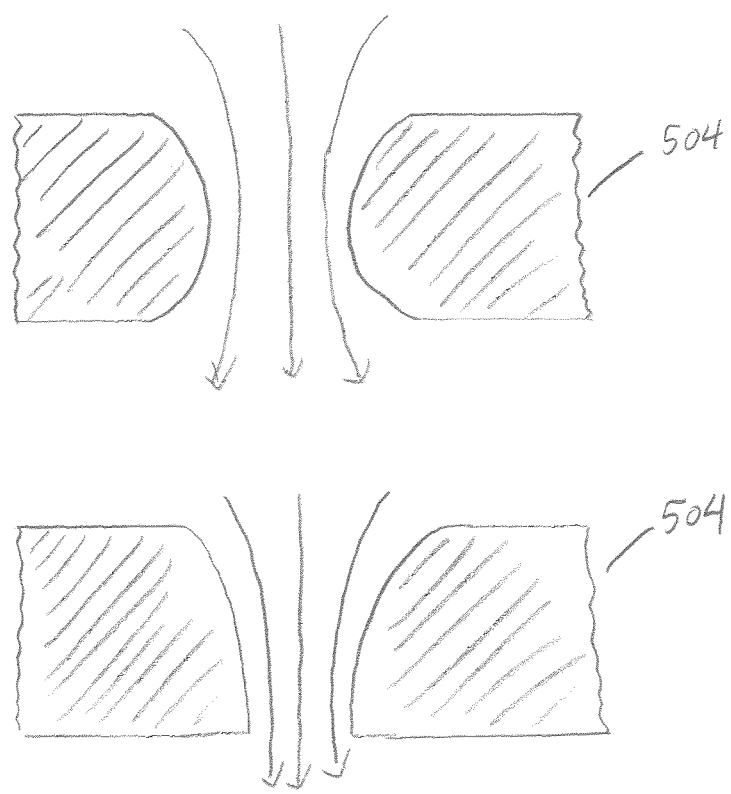

In another embodiment of a reactor 510 shown in FIG. 5B, a translating plate 512 is a solid plate lacking holes, and a stationary, perforated place 514 is disposed as a separation between adjacent compartments of the reactor 510. The stationary, perforated place 514 can be disposed as a separation between adjacent, distinct reactors in some implementations. When the translating plate 512 is driven in an up-and-down, reciprocating motion at a particular frequency, fluid is flowed through holes of the stationary, perforated place 514 into an adjacent compartment to achieve mixing. The frequency of the reciprocating motion can be adjusted to tune an effectiveness of mixing and a rate of mixing. For ease of presentation, a shaft and a drive unit are not shown in FIG. 5B, although it will be understood that such components can be included to impart motion to the translating plate 512. Certain aspects of the translating plate 512 and the stationary, perforated place 514 can be implemented as described above for the perforated plate 504 of FIG. 5A and FIG. 5C, and those aspects are not repeated.

Figure 6:
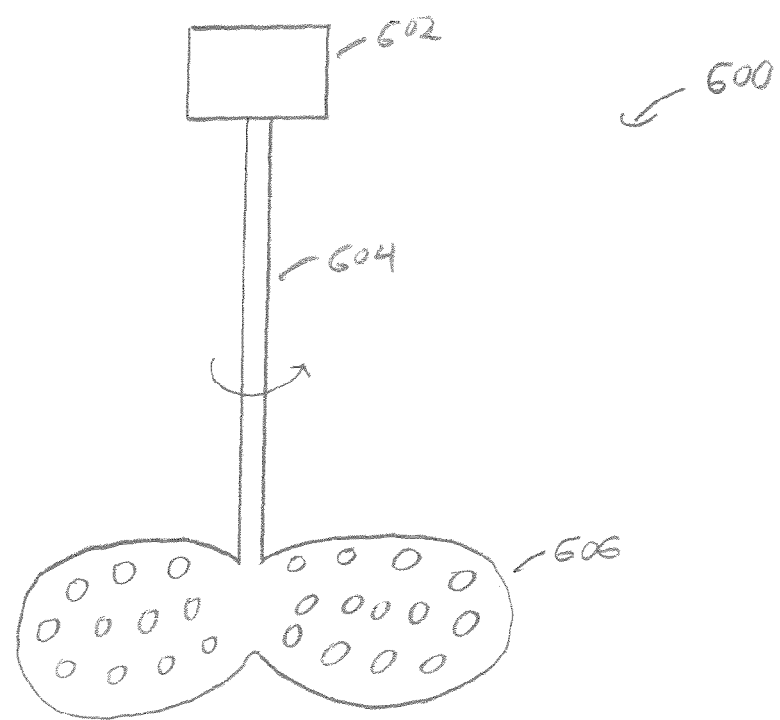

Other embodiments of agitation mechanisms are contemplated, such as those based on impellers, corkscrews, and Archimedes' screws. For example, referring to an embodiment in FIG. 6, an impeller 600 includes a set of paddles 606, which are connected to a motor 602 or other drive unit through a shaft 604. The paddles 606 are perforated, and mixing of a reaction mixture includes forcing the reaction mixture to flow through apertures or holes in the paddles 606. The impeller 600 can be operated under conditions of low shear mixing, which can be characterized by values of Re below 10,000, such as no greater than about 5000, no greater than about 2,500, no greater than about 1,000, no greater than about 500, no greater than about 250, no greater than about 100, no greater than about 50, no greater than about 25, or no greater than about 10. The rotational rate of the impeller 600 can be adjusted to tune an effectiveness of mixing and a rate of mixing. Certain aspects of the paddles 606 can be implemented as described above for the perforated plate 504 of FIG. 5A and FIG. 5C, and those aspects are not repeated.

Purification—Separation of Nanowires and Re-Dispersal in Solvent

At the purification stage 104 of FIG. 1, synthesized nanowires, agglomerates, and/or nanoparticles can be separated from other components of a reaction mixture through gravity or centrifugation-assisted settling. In some embodiments, a reaction mixture can be quenched or otherwise cooled to a desired temperature, such as about room temperature. Next, the cooled reaction mixture can be mixed or otherwise combined with a suitable re-dispersal solvent, and a solid product (including nanowires) can be permitted to settle. In some embodiments, the settled product is the desired product, so the supernatant is removed, and the settled product is kept. In other embodiments, the settled product is the undesired product, so the supernatant is removed and kept, and the settled product is disposed or recycled. The settled product can be separated by decanting or otherwise removing a supernatant, and then re-dispersed in the same solvent or another re-dispersal solvent, optionally with agitation to remove remaining components of the reaction mixture. This settle-wash process can be repeated one or more times, resulting in a dispersion of nanowires in a suitable solvent. In other embodiments, a hot, as-synthesized reaction mixture can be quenched by directly mixing or otherwise combining with a cooled re-dispersal solvent. After such quenching, other aspects of a settle-wash process can be similarly carried out as described above.

Examples of suitable re-dispersal solvents include alcohols, water, hydrocarbons (e.g., paraffins, hydrogenated hybrocarbons, and cycloaliphatic hydrocarbons), alkenes, alkynes, ketones, ethers, and combinations thereof. By way of example, nanowires can be re-dispersed in isopropanol, methanol, ethanol, water, or a combination thereof. Other specific examples of suitable solvents include 2-methyltetrahydrofuran, a chloro-hydrocarbon, a fluoro-hydrocarbon, acetaldehyde, acetic acid, acetic anhydride, acetone, acetonitrile, aniline, benzene, benzonitrile, benzyl alcohol, benzyl ether, butanol, butanone, butyl acetate, butyl ether, butyl formate, butyraldehyde, butyric acid, butyronitrile, carbon disulfide, carbon tetrachloride, chlorobenzene, chlorobutane, chloroform, cyclohexane, cyclohexanol, cyclopentanone, cyclopentyl methyl ether, diacetone alcohol, dichloroethane, dichloromethane, diethyl carbonate, diethyl ether, diethylene glycol, diglyme, di-isopropylamine, dimethoxyethane, dimethyl formamide, dimethyl sulfoxide, dimethylamine, dimethylbutane, dimethylether, dimethylformamide, dimethylpentane, dimethylsulfoxide, dioxane, dodecafluoro-1-hepatanol, ethanol, ethyl acetate, ethyl ether, ethyl formate, ethyl propionate, ethylene dichloride, ethylene glycol, formamide, formic acid, glycerine, heptane, hexafluoroisopropanol, hexamethylphosphoramide, hexamethylphosphorous triamide, hexane, hexanone, hydrogen peroxide, hypochlorite, i-butyl acetate, i-butyl alcohol, i-butyl formate, i-butylamine, i-octane, i-propyl acetate, i-propyl ether, isopropanol, isopropylamine, ketone peroxide, methanol and calcium chloride solution, methoxyethanol, methyl acetate, methyl ethyl ketone, methyl formate, methyl n-butyrate, methyl n-propyl ketone, methyl t-butyl ether, methylene chloride, methylene, methylhexane, methylpentane, mineral oil, m-xylene, n-butanol, n-decane, n-hexane, nitrobenzene, nitroethane, nitromethane, nitropropane, N-methyl-2-pyrrolidinone, n-propanol, octafluoro-1-pentanol, octane, pentane, pentanone, petroleum ether, phenol, propanol, propionaldehyde, propionic acid, propionitrile, propyl acetate, propyl ether, propyl formate, propylamine, p-xylene, pyridine, pyrrolidine, sodium hydroxide, sodium-containing solution, t-butanol, t-butyl alcohol, t-butyl methyl ether, tetrachloroethane, tetrafluoropropanol, tetrahydrofuran, tetrahydronaphthalene, toluene, triethyl amine, trifluoroacetic acid, trifluoroethanol, trifluoropropanol, trimethylbutane, trimethylhexane, trimethylpentane, valeronitrile, xylene, xylenol, and other similar compounds or solutions and any combination thereof.

More generally, a solvent can include water, an ionic or ion-containing solution, an ionic liquid, an organic solvent (e.g., a polar, organic solvent; a non-polar, organic solvent; an aprotic solvent; a protic solvent; a polar aprotic solvent, or a polar, protic solvent); an inorganic solvent, or any combination thereof. Oils also can be considered suitable solvents.

Examples of suitable organic solvents include 2-methyltetrahydrofuran, a chloro-hydrocarbon, a fluoro-hydrocarbon, a ketone, a paraffin, acetaldehyde, acetic acid, acetic anhydride, acetone, acetonitrile, an alkyne, an olefin, aniline, benzene, benzonitrile, benzyl alcohol, benzyl ether, butanol, butanone, butyl acetate, butyl ether, butyl formate, butyraldehyde, butyric acid, butyronitrile, carbon disulfide, carbon tetrachloride, chlorobenzene, chlorobutane, chloroform, cycloaliphatic hydrocarbons, cyclohexane, cyclohexanol, cyclohexanone, cyclopentanone, cyclopentyl methyl ether, diacetone alcohol, dichloroethane, dichloromethane, diethyl carbonate, diethyl ether, diethylene glycol, diglyme, di-isopropylamine, dimethoxyethane, dimethyl formamide, dimethyl sulfoxide, dimethylamine, dimethylbutane, dimethylether, dimethylformamide, dimethylpentane, dimethylsulfoxide, dioxane, dodecafluoro-1-hepatanol, ethanol, ethyl acetate, ethyl ether, ethyl formate, ethyl propionate, ethylene dichloride, ethylene glycol, formamide, formic acid, glycerine, heptane, hexafluoroisopropanol (or HFIP), hexamethylphosphoramide, hexamethyl phosphorous triamide, hexane, hexanone, hydrogen peroxide, hypochlorite, i-butyl acetate, i-butyl alcohol, i-butyl formate, i-butylamine, i-octane, i-propyl acetate, i-propyl ether, isopropanol, isopropylamine, ketone peroxide, methanol and calcium chloride solution, methanol, methoxyethanol, methyl acetate, methyl ethyl ketone (or MEK), methyl formate, methyl n-butyrate, methyl n-propyl ketone, methyl t-butyl ether, methylene chloride, methylene, methylhexane, methylpentane, mineral oil, m-xylene, n-butanol, n-decane, n-hexane, nitrobenzene, nitroethane, nitromethane, nitropropane, 2-N-methyl-2-pyrrolidinone, n-propanol, octafluoro-1-pentanol, octane, pentane, pentanone, petroleum ether, phenol, propanol, propionaldehyde, propionic acid, propionitrile, propyl acetate, propyl ether, propyl formate, propylamine, propylene glycol, p-xylene, pyridine, pyrrolidine, t-butanol, t-butyl alcohol, t-butyl methyl ether, tetrachloroethane, tetrafluoropropanol (or TFP), tetrahydrofuran (or THF), tetrahydronaphthalene, toluene, triethyl amine, trifluoroacetic acid, trifluoroethanol (or TFE), trifluoropropanol, trimethylbutane, trimethylhexane, trimethylpentane, valeronitrile, xylene, xylenol, or any combination thereof. Alcohols including from one to ten carbon atoms (i.e., $C_1$-$C_{10}$ alcohols, such as $C_1$-$C_6$ alcohols) can be considered suitable, such as methanol, ethanol, 1-propanol, 2-propanol, 1-butanol, 2-butanol, 2-methyl-1-propanol, 2-methyl-2-propanol, 1-pentanol, 2-pentanol, 3-pentanol, 2-2-dimethyl-1-propanol, 1-hexanol, as well as combinations, functionalized forms, and mixtures thereof with another fluid such as water. Alcohols include primary alcohols (e.g., n-propyl alcohol, isobutyl alcohol), secondary alcohols (e.g., isopropyl alcohol, cyclohexanol), tertiary alcohols (e.g., tert-amyl alcohol), or any combination thereof. Other examples of suitable alcohols include monohydric alcohols (e.g., methanol, ethanol, isopropyl alcohol, butyl alcohol, butanol, pentanol, hexadecan-1-ol, amyl alcohol, cetyl alcohol), polyhydric alcohols (e.g., ethylene glycol, glycerin, Butan-1,2,3,4-tetraol, erythritol, Pentane-1,2,3,4,5-pentol, xylitol, Hexane-1,2,3,4,5,6-hexol, mannitol, sorbitol, Heptane-1,2,3,4,5,6,7-heptol, volemitol), unsaturated aliphatic alcohols (e.g., Prop-2-ene-1-ol, allyl alcohol, 3,7-Dimethyloca-2,6-dien-1-ol, Geraniol, prop-2-in-1-ol, propargyl alcohol), alicyclic alcohols (e.g., cyclohexane-12,3,4,5,6-hexol, inositol, 2-(2-propyl)-5-methyl-cyclohexane-1-ol, Menthol), as well as combinations, functionalized forms, and mixtures thereof with other fluids (e.g., water).

Suitable inorganic solvents include, for example, water, ammonia, sodium hydroxide, sulfur dioxide, sulfuryl chloride, sulfuryl chloride fluoride, phosphoryl chloride, phosphorus tribromide, dinitrogen tetroxide, antimony trichloride, bromine pentafluoride, hydrogen fluoride, or any combination thereof.

Suitable ionic solutions include, for example, choline chloride, urea, malonic acid, phenol, glycerol, 1-alkyl-3-methylimidazolium, 1-alkylpyridnium, N-methyl-N-alkylpyrrolidinium, 1-butyl-3-methylimidazolium hexafluorophosphate, ammonium, choline, imidazolium, phosphonium, pyrazolium, pyridinium, pyrrolidnium, sulfonium, 1-ethyl-1-methylpiperidinium methyl carbonate, 4-ethyl-4-methylmorpholinium methyl carbonate, or any combination thereof. Other methylimidazolium solutions can be considered suitable, including 1-ethyl-3-methylimidazolium acetate, 1-butyl-3-methylimidazolium tetrafluoroborate, 1-n-butyl-3-methylimidazolium tetrafluoroborate, 1-butyl-3-methylimidazolium hexafluorophosphate, 1-n-butyl-3-methylimidazoliumhexafluoro phosphate, 1-butyl-3-methylimidazolium 1,1,1-trifluoro-N [(trifluoromethyl)sulfonyl]methanesulfonamide, 1-butyl-3-methylimidazolium bis(trifluoro methylsulfonyl)imide, 1-butyl-3-methylimidazolium bis[(trifluoromethyl)sulfonyl]amide, and 1-butyl-3-methylimidazolium bis[(trifluoromethyl)sulfonyl]imide, or any combination thereof.

Other suitable solvents include halogenated compounds, imides, and amides, such as N-ethyl-N,N-bis(1-methylethyl)-1-heptanaminium bis[(trifluoromethyl)sulfonyl] imide, ethyl heptyl-di-(1-methylethyl)ammonium 1,1,1-trifluoro-N-[(trifluoromethyl)sulfonyl]methane sulfonamide, ethylheptyl-di-(1-methyl ethyl)ammonium bis(trifluoromethylsulfonyl)imide, ethylheptyl-di-(1-methylethyl)ammonium bis[(trifluoromethyl)sulfonyl]amide, or any combination thereof. A fluid can also include ethylheptyl-di-(1-methylethyl)ammonium bis[(trifluoromethyl)sulfonyl] imide, $N_5N_5N$-tributyl-1-octanaminium trifluoromethane sulfonate, tributyloctylammonium triflate, tributyloctylammonium trifluoromethanesulfonate, N,N,N-tributyl-1-hexanaminium bis[(trifluoromethyl)sulfonyl]imide, tributylhexylammonium 1,1,1-trifluoro-N-[(trifluoromethyl)sulfonyl]methanesulfonamide, tributylhexylammonium bis(trifluoromethylsulfonyl)imide, tributylhexylammonium bis[(trifluoromethyl)sulfonyl]amide, tributylhexylammonium bis[(trifluoromethyl)sulfonyl]imide, N,N,N-tributyl-1-heptanaminium bis[(trifluoromethyl)sulfonyl]imide, tributylheptylammonium 1,1,1-trifluoro-N-[(trifluoro methyl)sulfonyl]methanesulfonamide, tributylheptylammonium bis (trifluoromethylsulfonyl)imide; tributylheptylammonium bis[(trifluoromethyl)sulfonyl]amide, tributylheptylammonium bis[(trifluoromethyl)sulfonyl]imide, N,N,N-tributyl-1-octanaminium bis[(trifluoromethyl) sulfonyl]imide, tributyloctylammonium 1,1,1-trifluoro-N-[(trifluoromethyl)sulfonyl] methane sulfonamide, tributyloctylammonium bis (trifluoromethylsulfonyl)imide, tributyloctylammonium bis [(trifluoromethyl)sulfonyl]amide, tributyloctylammonium bis[(trifluoromethyl)sulfonyl]imide, 1-butyl-3-methylimidazolium trifluoroacetate, 1-methyl-1-propylpyrrolidinium 1,1,1-trifluoro-N-[(trifluoromethyl)sulfonyl]methanesulfonamide, 1-methyl-1-propylpyrrolidinium bis(trifluoro methylsulfonyl)imide, 1-methyl-1-propylpyrrolidinium bis[(trifluoromethyl)sulfonyl]amide, 1-methyl-1-propylpyrrolidinium bis[(trifluoromethyl)sulfonyl]imide, 1-butyl-1-methyl pyrrolidinium 1,1,1-trifluoro-N-[(trifluoromethyl)sulfonyl]methanesulfonamide, 1-butyl-1-methylpyrrolidinium bis(trifluoromethylsulfonyl)imide, 1-butyl-1-methylpyrrolidinium bis[(trifluoromethyl)sulfonyl]amide, 1-butyl-1-methylpyrrolidinium bis[(trifluoromethyl)sulfonyl]imide, 1-butylpyridinium 1,1,1-trifluoro-N-[(trifluoromethyl)sulfonyl]methanesulfonamide, 1-butylpyridinium bis(trifluoromethylsulfonyl)imide, 1-butylpyridinium bis[(trifluoromethyl) sulfonyl]amide, 1-butylpyridinium bis[(trifluoromethyl)sulfonyl]imide, 1-butyl-3-methyl imidazolium bis(perfluoroethylsulfonyl)imide, butyltrimethylammonium bis(trifluoromethyl sulfonyl) imide, 1-octyl-3-methylimidazolium 1,1,1-trifluoro-N-[(trifluoromethyl)sulfonyl]methanesulfonamide, 1-octyl-3-methylimidazolium bis(trifluoromethylsulfonyl)imide, 1-octyl-3-methylimidazolium bis[(trifluoromethyl)sulfonyl]amide, 1-octyl-3-methylimidazolium bis[(trifluoromethyl)sulfonyl] imide, 1-ethyl-3-methylimidazolium tetrafluoroborate, $N_5N_5N$-trimethyl-1-hexanaminium bis[(trifluoromethyl)sulfonyl]imide, hexyltrimethylammonium 1,1,1-trifluoro-N-[(trifluoromethyl)sulfonyl]methanesulfonamide, hexyltrimethylammonium bis(trifluoromethylsulfonyl)imide, hexyltrimethylammonium bis[(trifluoromethyl)sulfonyl]amide, hexyltrimethylammonium bis[(trifluoromethyl)sulfonyl]imide, N,N,N-trimethyl-1-heptanaminium bis[(trifluoromethyl)sulfonyl]imide, heptyltrimethylammonium 1,1,1-trifluoro-N-[(trifluoromethyl)sulfonyl]methanesulfonamide, heptyltrimethylammonium bis(trifluoro methylsulfonyl)imide, heptyltrimethylammonium bis[(trifluoromethyl)sulfonyl]amide, heptyltrimethylammonium bis[(trifluoromethyl) sulfonyl]imide, N,N,N-trimethyl-1-octanaminium bis [(trifluoromethyl)sulfonyl]imide, trimethyloctylammonium 1,1,1-trifluoro-N-[(trifluoro methyl)sulfonyl]methanesulfonamide, trimethyloctylammonium bis(trifluoromethylsulfonyl)imide, trimethyloctylammonium bis[(trifluoromethyl)sulfonyl]amide, trimethyloctylammonium bis [(trifluoromethyl)sulfonyl]imide, 1-ethyl-3-methylimidazolium ethyl sulfate, or any combination thereof.

In the case of a polyol process, for example, silver nanowires can be stabilized with polyvinylpyrrolidone (or PVP), which is a polymer formed from the monomer N-vinylpyrrolidone. The PVP is typically soluble in water (>100 mg/ml), methanol, ethanol, glycerol, other alcohols, chloroform, and acetic acid, and is typically insoluble in dimethyl ether, ethyl acetate, acetone, toluene, xylene, mineral oil, and carbon tetrachloride. The solubility of PVP can arise from hydrogen bonding between double bond oxygen atoms in PVP polymeric chains and hydroxyl groups in solvent molecules. Thus, PVP typically does not dissolve in polar solvents that lack hydrogen bond donor atoms, such as acetone.

As surfaces of silver nanowires can be stabilized by PVP, settling of the nanowires in a solvent with more dispersing force for PVP (e.g., stronger hydrogen bonding) can be more difficult. This difficulty can be more pronounced in the case of smaller diameter nanowires (more difficult to settle) or reactions using glycerol (more viscous). Compared to isopropanol, for example, methanol can have a weaker hydrogen bonding strength with respect to PVP, and can be a particularly desirable re-dispersal solvent for silver nanowires. The hydrogen bonding strength can be related to an electronegativity of an atom adjacent to a donating hydrogen. Typically, the more electronegative the atom is, the stronger is the hydrogen bond. Comparing methanol with isopropanol, for example, electronegative oxygen atoms can have different electron densities from adjacent carbon atoms in methanol versus isopropanol. Therefore, isopropanol can have stronger hydrogen bonding strengths than methanol, and PVP can be more stable or dispersable in isopropanol than in methanol (albeit PVP is sufficiently soluble in methanol to allow removal of PVP through a settle-wash process). For example, a reaction mixture (including PVP and gycerol) mixed with isopropanol at 1:2 volume/volume can exhibit little settling in 1-5 days, while a reaction mixture of the same composition can readily settle when mixed with methanol in the same amount of time. As another example, a reaction mixture combined with isopropanol can have a thicker or less clear supernatant comparing to a corresponding mixture with methanol when subjected to the same speed and time of centrifugation or settling.

Purification—Removal of Agglomerates

As described above, proper agitation in a solution synthesis reaction for producing nanowires can effectively mitigate against the formation of clumps, which would otherwise result in loss when the reaction is allowed to proceed long enough to produce longer nanowires, to increase yield, or both. Any remaining clumps or agglomerates can be removed according to an agglomerate removal procedure at the purification stage 104 of FIG. 1, subsequent to the reaction stage 102 of FIG. 1.

Also, even if not initially present or if present to a low degree, agglomerates sometimes can form during storage, and commercially available, stock dispersions of nanowires can include agglomerates that are not readily re-dispersed or fragmented with agitation. For example, agglomerates sometimes can form in a container, when nanowires in a dispersion settle to the bottom and are not readily re-dispersed with agitation. Other times agglomerates can form when a container is open, and a solvent dries, causing agglomeration. Shaking or stirring a nanowire dispersion can break up some agglomerates, but typically not all of them. Shaking vigorously can form more agglomerates instead of dispersing, which in some cases can be attributed to high shear formed by vortices. Sonication also can be ineffective in sufficiently breaking up agglomerates, because, even for short times at low power, sonication can undesirably reduce an aspect ratio of nanowires (e.g., by breaking or fragmenting the nanowires). For example, sonication can yield about 50% reduction in lengths of nanowires after about 30 seconds, with a correspondingly modest reduction in amount of agglomerates.

In some embodiments, a nanowire dispersion that is determined to have an unacceptable level of agglomerates can be "de-agglomerated" according to a procedure for agglomerate removal. By way of preview, the nanowire dispersion can be transferred from an original container to a set of settling containers, while avoiding or reducing agitation of the transferred contents for a sufficient time to allow non-dispersable agglomerates to settle to the bottoms of the settling containers. Next, top portions of the contents of the settling containers can be transferred to another set of containers. Such embodiments can be used, for example, to purify silver nanowire dispersions by removing clumps or agglomerates of nanowires that form during synthesis, during storage, or both. Such embodiments also can be used, for example, to purify stock silver nanowire dispersions.

Figure 7A:
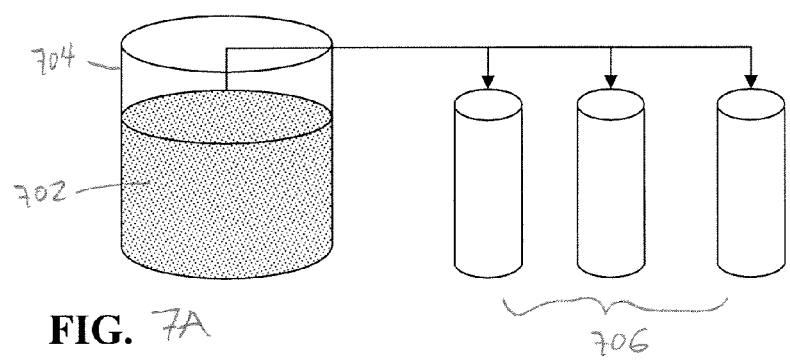
FIG. 7A through FIG. 7C show a procedure for agglomerate removal, according to an embodiment of the invention.
Figure 7B:
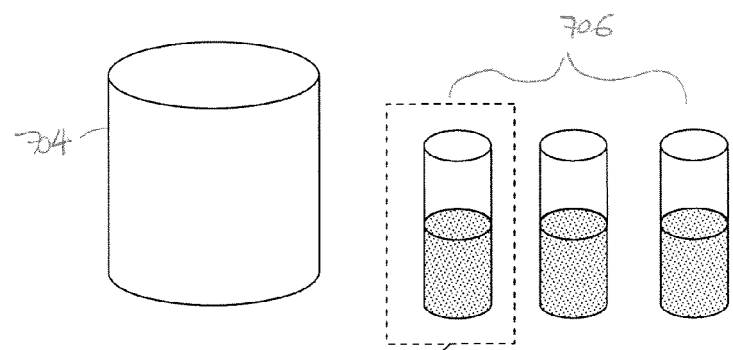
Figure 7C:
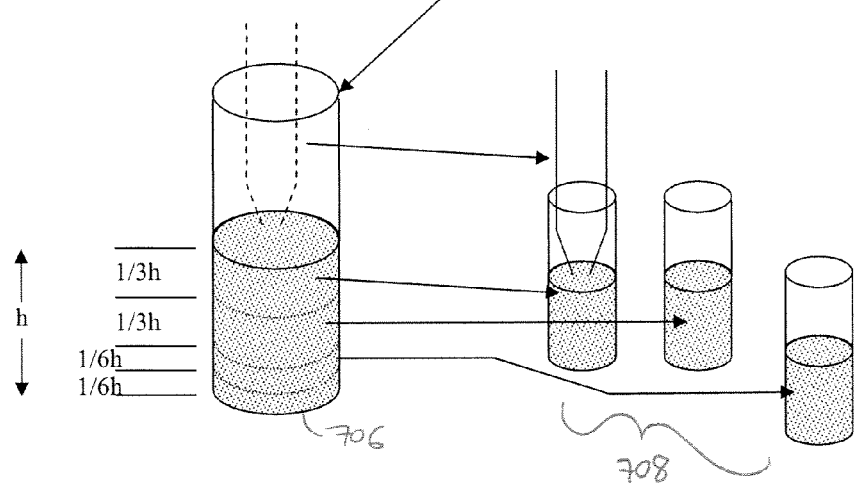

A procedure for agglomerate removal is shown in FIG. 7A through FIG. 7C. As shown in FIG. 7A, a nanowire dispersion 702 is initially disposed in a container 704, which is referred as an original container. The nanowire dispersion 702 includes a solvent and nanowires. The nanowires can be synthesized according to a solution synthesis reaction described above, and then re-dispersed in the solvent, such as isopropanol, methanol, ethanol, water, or another suitable solvent or combination of solvents. The nanowire dispersion 702 also can be a commercially available, stock dispersion of nanowires.

Next, as shown in FIG. 7B, at least a portion (e.g., all or substantially all) of the nanowire dispersion 702 is transferred from the original container 704 to a first set of settling containers or vessels 706. By way of example, the settling containers 706 can be cylindrical-type containers, such as centrifuge tubes or scintillation vials (e.g., 40 dram scintillation vials). By a "cylindrical-type" container, it is contemplated that at least a majority of an interior volume of such a container is of a cylindrical shape. A cross-section of the settling containers 706 can be circular, elliptical, square-shaped, rectangular, or any other regular polygonal shape or an irregular shape. Although three settling containers 706 are shown, more or less settling containers can be used, depending on, for example, a total volume of the nanowire dispersion 702 to be transferred.

For certain implementations, it can be desirable for the settling containers 706 to have a sufficient height for effective agglomerate removal. A sufficient height can be determined from a level of agglomerates or other non-dispersable solids in a dispersion and a tendency of those solids to pack or settle at the bottom. High aspect ratio containers (e.g., a ratio of height to cross-sectional width or extent of a container of at least about 2, at least about 3, at least about 4, or at least about 5, and up to about 10, up to about 15, or more) can allow more height for the same volume, but sufficient height also can be obtained with lower aspect ratio containers.

The transfer of the nanowire dispersion 702 can be carried out, for example, using a pipette or a pipette tip of sufficient size to transfer a desired portion of the nanowire dispersion 702 from the original container 704 to a particular settling container 706, in one transfer operation and without having to reuse the same pipette or pipette tip for the same settling container 706 or a different settling container 706. In such manner, each settling container 706 includes a respective content corresponding to a respectively, transferred portion of the nanowire dispersion 702. In place of, or in combination with the use of a pipette, other transfer techniques can be used, such as the use of a siphon hose, an aspirator, and the like.

By way of example, a size and a number of the settling containers 706 can be selected such that the nanowire dispersion 702 fills each settling container 706 from about 5 cm to about 10 cm from the bottom of the settling container 706. Filling the settling containers 706 to a lesser degree can affect resolution. Filling to a greater degree can involve prolonged settling times. During filling, it can be desirable to avoid the nanowire dispersion 702 from contacting or getting on container walls above a liquid line or interface.

The transferred contents of the settling containers 706 are maintained in the substantial absence of agitation for a sufficient time to allow non-dispersable agglomerates to settle to the bottoms of the settling containers 706. The amount of settling time can depend on a height of the contents of the settling containers 706. By way of example, the settling time can be in the range of about 5 minutes to about 30 minutes, such as about 10 minutes to about 25 minutes, about 10 minutes to about 20 minutes, or about 15 minutes, for each centimeter of vertical height of a liquid column in the settling containers 706. The settling time also can depend at least partly on the nature of nanostructures involved, such as nanowires. For example, smaller diameter nanowires can take longer to settle whereas agglomerates can settle in less than about 1 minute. The settling time can be in the range of about 1 minute to about 5 days, for certain implementations.

After the settling time has elapsed, portions of the content from each settling container 706 are transferred to a second set of containers 708, which also can have a high aspect ratio similar to the settling containers 706. As shown in FIG. 7C, a sufficient number of the containers 708 is used to create at least three partitions of the transferred content from the settling containers 706. These three partitions can include: 1) about a top one-third (or top ⅓) of the content of each settling container 706; 2) about a middle one-third (or middle ⅓) of the content of each settling container 706 (or about a top one-half after removal of the first partition); and 3) about a middle one-sixth (or middle ⅙) of the content of each settling container 706 (or about a top one-half after removal of the first and second partitions). While three partitions are shown, it is contemplated that the number of partitions can be 2, 3, 4, 5, 10, 15, 20, 25, or more. The remaining content in each settling container 706, namely about a bottom one-sixth, can be discarded. The transfer of the partitions to the containers 708 can be carried out, for example, using a pipette or a pipette tip. In place of, or in combination with the use of a pipette, other transfer techniques can be used, such as the use of a siphon hose, an aspirator, and the like. In some implementations, removing a middle partition allows for the selection of a certain type of nanoparticle morphology; for instance, the very top partitions may substantially contain small particles and short wires, the very bottom partitions may contain a substantial amount of large agglomerates, while the middle partitions may contain the desired length and diameter of nanowires.

In some implementations, at least a subset or all of a given partition across the settling containers 706 can be transferred to a common container 708. For example, all of the first partitions across the settling containers 706 can be transferred into one container 708, all of the second partitions across the settling containers 706 can be transferred into another common container 708, and all of the third partitions across the settling containers 706 can be transferred into yet another common container 708. As another example, each partition of a particular settling container 706 can be transferred to a designated container 708 for that partition and for that settling container 706. Alternatively, the different partitions can be mixed together into a common container 708. For finer separation resolution, it can be desirable to transfer different partitions to separate containers 708. Although three partitions are shown, more or less partitions can be used. For example, it is also contemplated that the above-described de-agglomeration procedure can be implemented with a single partition, such as a top ⅚ of the content of each settling container 706.

After the different partitions have been transferred, each container 708 can be gently agitated to disperse any agglomerates, such as shaking by hand. Next, a concentration of nanowires in each container 708 can be measured, such as using an optical technique. By way of example, a concentration of silver nanowires in a dispersion can be measured by optical absorption in the ultraviolet (UV) to visible (vis) portion of the electromagnetic spectrum. The concentration of nanowires in a dispersion can be determined from measurements of optical density, which can be measured by transmitting light through the dispersion along a particular direction and determining the attenuation of the light. The light can be attenuated mainly due to scattering, although some absorption also can be involved. The measured attenuation can be compared to attenuation measurements for dispersions of known nanowire concentration.

If the concentration of nanowires in a particular container 708 is higher than desired, the desired concentration can be obtained by diluting the content of the container 708 with the same or similar solvent as used in the original nanowire dispersion 702. After dilution, the nanowire concentration can be re-measured.

If the concentration of nanowires in a particular container 708 is lower than desired, the desired concentration can be obtained by allowing the container 708 to settle in an environment that is substantially free from agitation for a sufficient settling time. After the settling time has elapsed, a calculated amount of supernatant can be removed from the container 708 to obtain the desired concentration of nanowires. The settling time for a particular container 708 including a particular partition can depend on a height of the partition in the container 708. By way of example, the settling time can be in the range of about 0.5 hour to about 3 hours, such as about 1 hour to about 2.5 hours, about 1 hour to about 2 hours, or about 1.5 hours, for each centimeter of vertical height of a liquid column in the container 708. The settling time also can depend at least partly on the nature of nanostructures involved, such as nanowires. After the supernatant has been removed, the container 708 can be gently agitated, and a nanowire concentration can be re-measured.

Once a desired concentration of nanowires has been obtained for a container 708, a level of agglomerates of its content can be analyzed to determine whether the nature and degree of agglomeration is acceptable. An acceptable degree of agglomeration can depend on the intended use of a nanowire dispersion. The following discussion explains one example, among others, of agglomerate analysis for nanowire dispersions that can be used to form coatings or transparent conductive electrodes.

In some implementations, agglomerates can be classified by size. Large agglomerates can reside at the bottom of a container within about 30 seconds after shaking, and can be of sufficient size to clog or otherwise impede the operation of pipettes. Small agglomerates can be readily drawn into a pipette without interfering with the operation of the pipette, but can cause disruption of coatings, such as in the form of streaks or point defects. Drying agglomerates can correspond to those that form in a coating after a nanowire suspension is drawn down. These drying agglomerates are typically nucleated by dust particles from an environment.

The agglomeration analysis can begin by gently agitating a nanowire dispersion for a period of time, such as in the range of about 10 minutes to about 30 minutes or about 20 minutes. It can be desirable to avoid the use of a vortex in such agitation, as vortices sometimes can cause agglomerates to form. After agitation, the dispersion can be allowed to settle for a period of time, such as in the range of about 5 seconds to about 2 minutes or about 30 seconds. Next, an attempt can be made to pipette a small amount of the dispersion (e.g., about 0.3 mL) to determine whether drawing the dispersion into the pipette can be carried out without clogging the pipette. If the pipette becomes clogged, the dispersion can be discarded, or can be submitted (e.g., re-submitted) for the agglomerate removal procedure described above.

If the dispersion can be pipetted without clogging, a small amount of the dispersion (e.g., about 0.3 mL) can be pipetted onto a top of a fineness of grind gauge. As can be appreciated, a fineness of grind gauge typically includes a trough of variable depth. The top corresponds to a deepest portion of the trough. If a material including particles is distributed uniformly in a single particle thickness along the trough, these particles can protrude above the trough starting at a point that their physical size exceeds the depth of the trough. If a straight edge scraper is brought to bear on sides of the gauge in conjunction with the deepest portion of the trough and then moved down a path towards a shallow end, the scraper can contact the protruding particles, and, on continued movement, screen or push these particles from the path.

Soon after an amount of a dispersion has been pipetted onto the top of the fineness of grind gauge (e.g., before drying or new agglomerate formation), the scraper held substantially perpendicularly to the gauge can be used to draw the dispersion down towards the shallow end of the trough at, for example, about 1.5 inches/s. Soon thereafter (e.g., before drying), the presence and number of agglomerates of each size can be determined by their location along the trough. Agglomerates can be visible as point defects or streaks. For streaks, the location can be recorded as an onset of the streak, namely a portion of the streak that is closest to the top of the gauge. The detection and recording of the number of agglomerates of each size can be repeated after allowing the dispersion to dry. In some instances, agglomerates can form during drying either because of environment contamination or the presence of a nucleus in solution, such dust or small agglomerates. In place of, or in conjunction with, a fineness of grind gauge, another technique can be used to determine the presence and number of agglomerates, such as using an optical technique.

The measured number of agglomerates of each size can be compared to a reference agglomerate size distribution for an acceptable dispersion to determine whether a dispersion at issue is acceptable, should be re-submitted for an agglomerate removal procedure, or discarded. It is noted that the specification of a reference agglomerate size distribution can depend on a particular application for a nanowire dispersion. In some implementations, a reference agglomerate size distribution can be specified by measuring an agglomerate size distribution for different nanowire dispersions, using the dispersions in a desired application (e.g., forming coatings), analyzing results of the application to determine whether the results are of acceptable quality, and correlating the agglomerate size distributions for the dispersions to the quality of the results obtained using the dispersions.

By way of example, a reference agglomerate size distribution for an acceptable dispersion for some applications can be specified as: 1) a substantial absence of agglomerates having a size of about 100 µm or greater; 2) a substantial absence of agglomerates having a size of about 90 µm or greater; 3) a substantial absence of agglomerates having a size of about 80 µm or greater; 4) a substantial absence of agglomerates having a size of about 70 µm or greater; 5) a substantial absence of agglomerates having a size of about 60 µm or greater; 6) a substantial absence of agglomerates having a size of about 50 µm or greater; or 7) a substantial absence of agglomerates having a size of about 40 µm or greater.

Agitation of a nanowire dispersion during agglomerate analysis and removal can be carried out in a low shear manner to mitigate against the formation of agglomerates. Suitable low shear agitation techniques can be viewed as largely parallel and subject to similar considerations as those described in the context of solution synthesis reactions. For example, low shear agitation can be carried out manually (e.g., shaking by hand), or using a wrist action shaker, a rotary shaker, a rocking shaker, or another agitation equipment that allows for dispersal of nanowires while mitigating against vortices, clumping of nanowires, fragmenting of nanowires, or other detrimental effects. Such low shear agitation techniques also can be applied to nanowire dispersions during storage or subsequent to storage.

Reducing agglomerates can improve the batch-to-batch consistency of nanowire dispersions in terms of the substantial absence above a given size. Thus, nanowire dispersions from a given batch in a group of batches can be made consistent with similarly fabricated nanowire dispersions in other batches in the group.

EXAMPLES

The following examples describe specific aspects of some embodiments of the invention to illustrate and provide a description for those of ordinary skill in the art. The examples should not be construed as limiting the invention, as the examples merely provide specific methodology useful in understanding and practicing some embodiments of the invention.

Example 1

Synthesis of Nanowires

Figure 8:
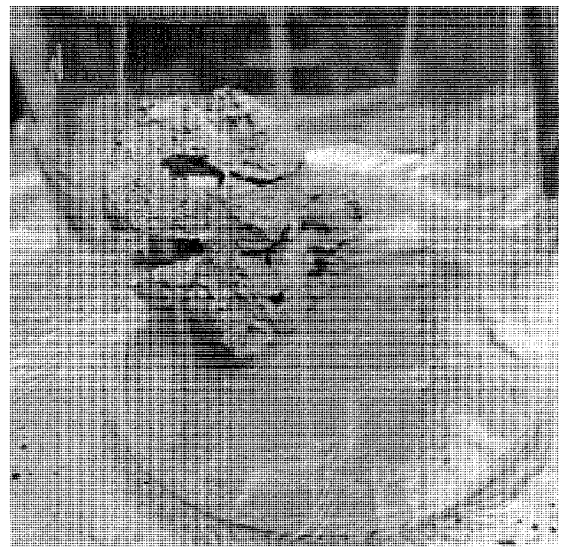
FIG. 8 is a photograph that shows clumps remaining at the end of a reaction with insufficient agitation, according to an embodiment of the invention.

FIG. 8 is a photograph that shows clumps remaining at the end of a reaction with insufficient agitation. In this particular example, there was no stirring or other agitation of the reaction. The reaction gave about 65% yield (small scale—400 ml). A similar reaction using a conventional stir bar gave about 83% yield. By contrast, a similar reaction that was agitated using a grape press of one embodiment gave about 92% yield (small scale—400 ml).

Differences in yield are even more pronounced for larger scale reactions (e.g., 4 L), in which the use of the grape press allowed for about 70%-80% yield whereas conventional stirring gave about 40%-50% yield.

In the case of a reaction that has been conventionally stirred, an amount of clumping is typically about the same, but with clumps broken up into smaller pieces.

Example 2

Synthesis of Nanowires

Figure 9:
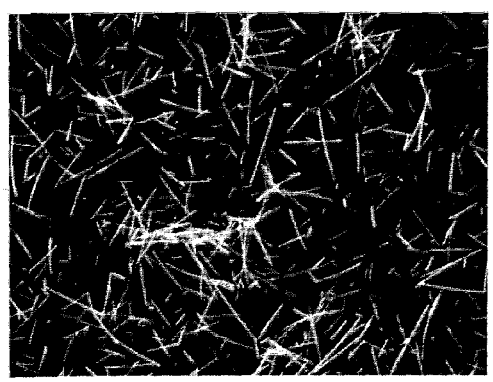
FIG. 9A and FIG. 9B are dark field microscope images of unpurified reaction products of nanowire solution synthesis reactions at about 200 times magnification, according to an embodiment of the invention.
Figure 9:
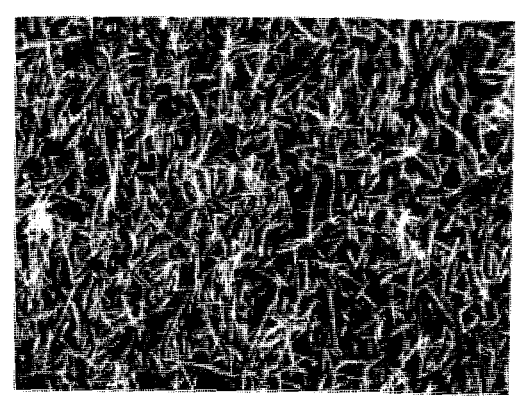

FIG. 9A and FIG. 9B are dark field microscope images of unpurified reaction products of nanowire solution synthesis reactions at about 200 times magnification. The image in FIG. 9A is for a reaction with no stirring or other agitation of the reaction. The image in FIG. 9B is for a reaction that was agitated using a grape press of one embodiment.

Lengths of nanowire are longer and a number of nanoparticles is less in the reaction using the grape press compared to the unstirred reaction. These differences are also observed when comparing a conventionally stirred reaction to the grape press. When comparing the grape press to unstirred or conventionally stirred reactions, another difference is the reduction or substantially absence of clumping or formation of agglomerates through the use of the grape press.

Example 3

Synthesis of Nanowires

Figure 10:
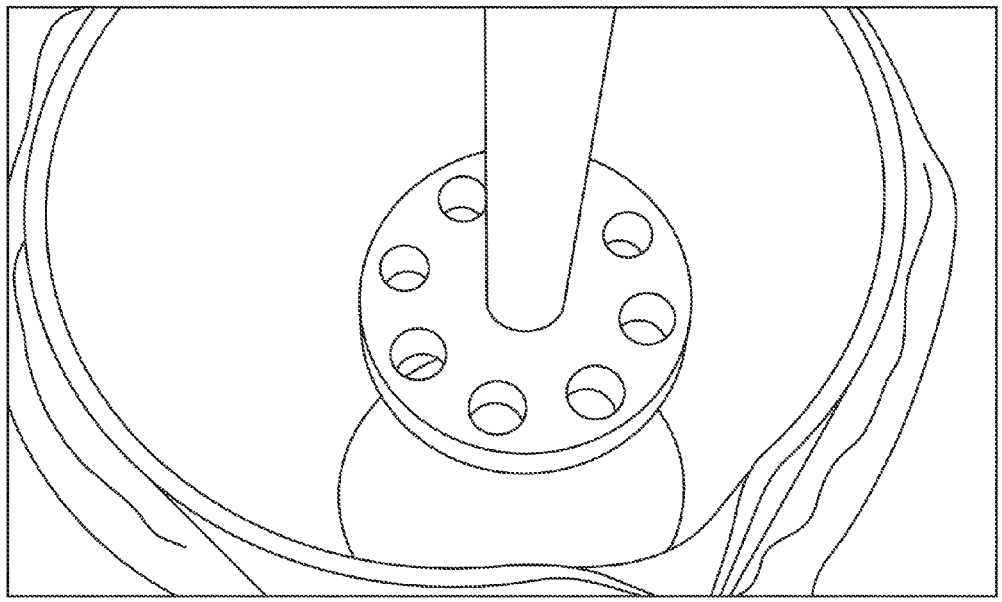
FIG. 10 is a photograph of a grape press of one embodiment.

FIG. 10 is a photograph of a grass press of one embodiment. The grape press allows for mixing and reduces clumping of solution synthesis reactions, resulting in higher yields. With no stirring or other agitation, a reaction gave about 64% yield. A similar reaction using a conventional stir bar gave about 79% yield. By contrast, a similar reaction that was agitated using a grape press of one embodiment gave about 92% yield. Yield is measured as the amount of silver cation reducing into usable silver nanowires.

Example 4

Removal of Agglomerates

The following Standard Operating Procedure (SOP) represents one example, among others, of a procedure for agglomerate removal for a dispersion of silver nanowires (AgNWs). The SOP can be used to ensure there are very few or no agglomerates, which can cause defects, lower conductivity, higher haze, clogging of coating equipment, and other detrimental effects when AgNWs are used in forming transparent conductive electrodes.

By way of example, the SOP can be applied AgNWs that are dispersed in isopropanol (IPA), methanol, ethanol, water, or another suitable solvent.

Materials:
(1) Nanowire dispersion that has been analyzed for agglomerates.
(2) High aspect ratio containers (e.g., centrifuge tunes and 40 dram scintillation vials).
(3) Rack to hold containers securely.
(4) Pipette.
(5) IPA.

Checklist:
(1) Enough high aspect ratio containers to transfer the nanowire dispersion into and then create four more partitions.
(2) The containers should be chosen such that the dispersion will fill about 5 cm to about 10 cm from the bottom. Lesser height of filing can affect resolution. Greater height of filing can take prolonged time for settling.
(3) Pipettes or pipette tips large enough to transfer dispersion from an original container to vials without reuse.

Procedure (Performed on One Container of AgNWs):
(1) Perform agglomerate analysis on nanowire dispersion in question. If the dispersion passes the agglomerate analysis, then procedure is stopped at this stage.
(2) Set up high aspect ratio containers in a rack to mitigate against spillage or disruption of settling.
(3) Draw nanowire dispersion slowly into a pipette without drawing into pipette body (e.g., if auto pipette is used).
(4) Slowly empty pipette into a new high aspect ratio container by filling from the bottom upward—avoid dispersion from contacting or getting on container walls above a liquid line or interface, as agglomerate formation on the container walls otherwise may result.
(5) Fill nanowire dispersion from about 5 cm to about 10 cm above the bottom. If there is more than about 10 cm of dispersion, then divide into multiple containers.
(6) Place filled containers in a place substantially free from bumps, shaking, or vibration—for about 15 minutes for every about 1 cm of vertical height of liquid (settling time).
(7) After settling time passes, separate into four partitions from the top downward according to the following: i) Use a new pipette to draw dispersion starting from the top of a column of liquid and move the pipette downward while the liquid line moves downward, ii) Avoid placing the pipette deeper than about 3 mm from a meniscus, iii) Transfer dispersion slowly to a new high aspect ratio container using the same procedure and considerations as stage 4. If more than one pipette load is involved for the transfer, then change the pipette tip.
 a. Partition 1 is the top ⅓ (by height not volume) of the column of liquid.
 b. Partition 2 is the middle ⅓ of the column of liquid (thus the top ½ remaining after taking the first top ⅓).
 c. Partition 3 is the column section from ⅔ to ⅚ referenced from the top of the original column of liquid (thus the top ½ remaining after taking partitions 1 and 2).
 d. Partition 4 is the remaining liquid. Discard partition 4.
(8) Gently shake each partition for about 60 seconds by hand.
(9) Measure silver concentration with UV-vis and adjust according to the following:
 a. If concentration is higher than desired, then dilute with a solvent and proceed to stage 12.
 b. If concentration is lower than desired, then continue with stage 10.
(10) Place partitions in a place substantially free from bumps, shaking, or vibration—for about 1.5 hours for every about 1 cm of vertical height of liquid (settling time).
(11) After settling, remove a calculated amount of supernatant to obtain a desired silver concentration.
(12) Shake each partition for about 60 seconds and analyze each partition:
 a. Re-measure silver concentration.
 b. Repeat agglomerate analysis.

Example 5

Purification

Figure 11:
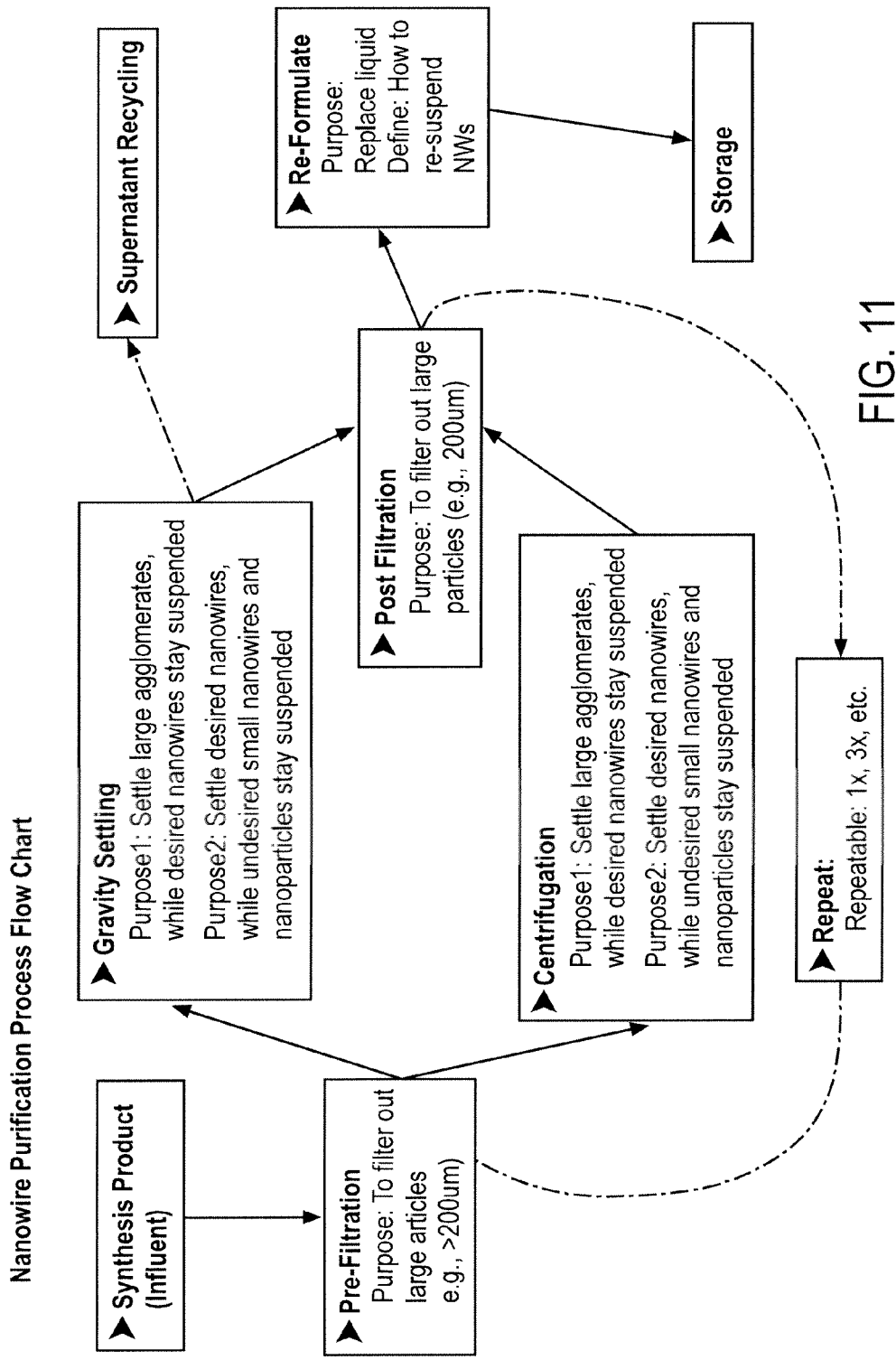
FIG. 11 is an example of a purification process flow chart, according to an embodiment of the invention.
Figure 12:
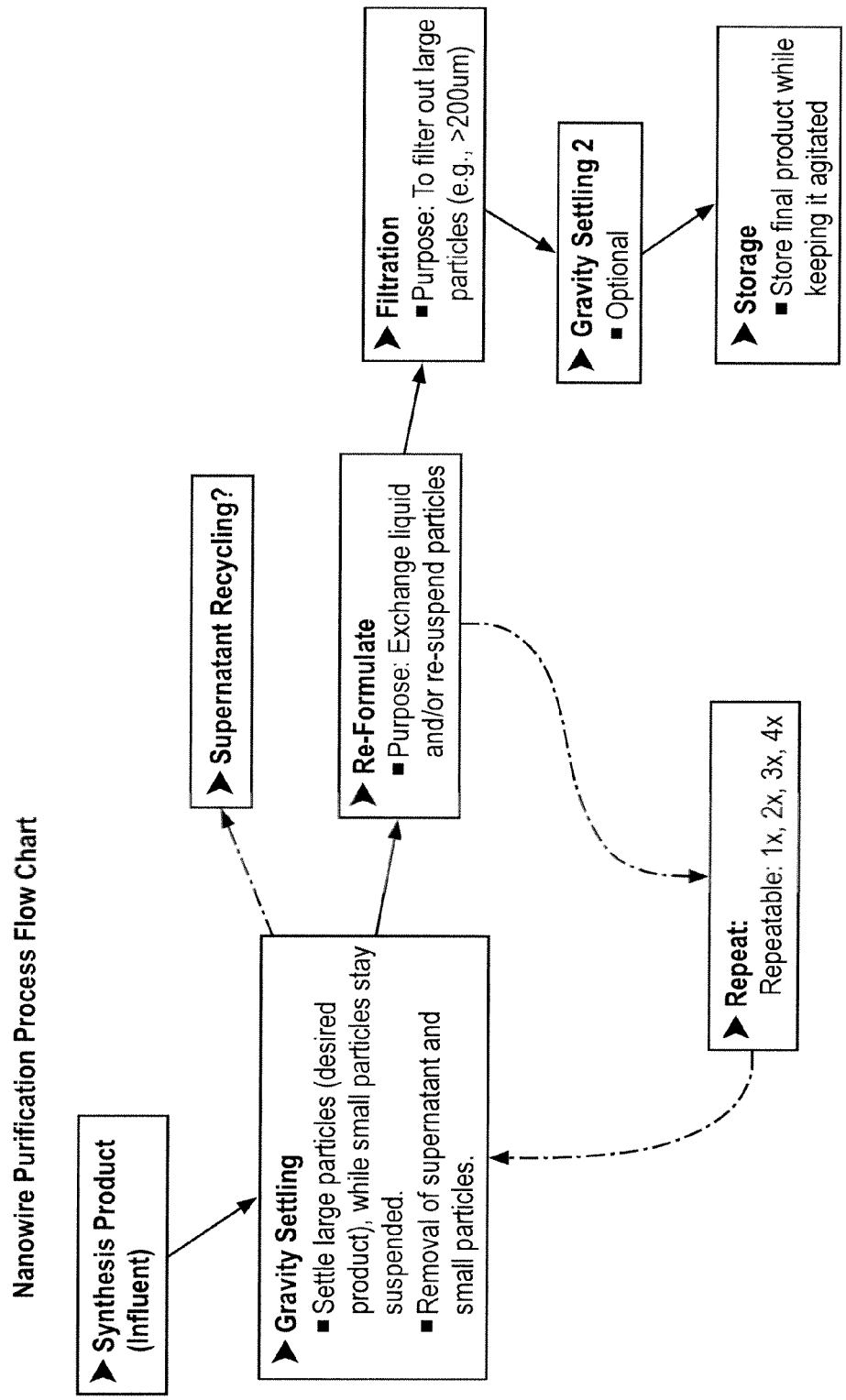
FIG. 12 is another example of a purification process flow chart, according to an embodiment of the invention.

FIG. 11 and FIG. 12 are examples of nanowire purification process flow charts, according to embodiments of the invention. One or more of the operations can be optional, repeatable, or by-passable.

Example 6

Purification

Figure 13:
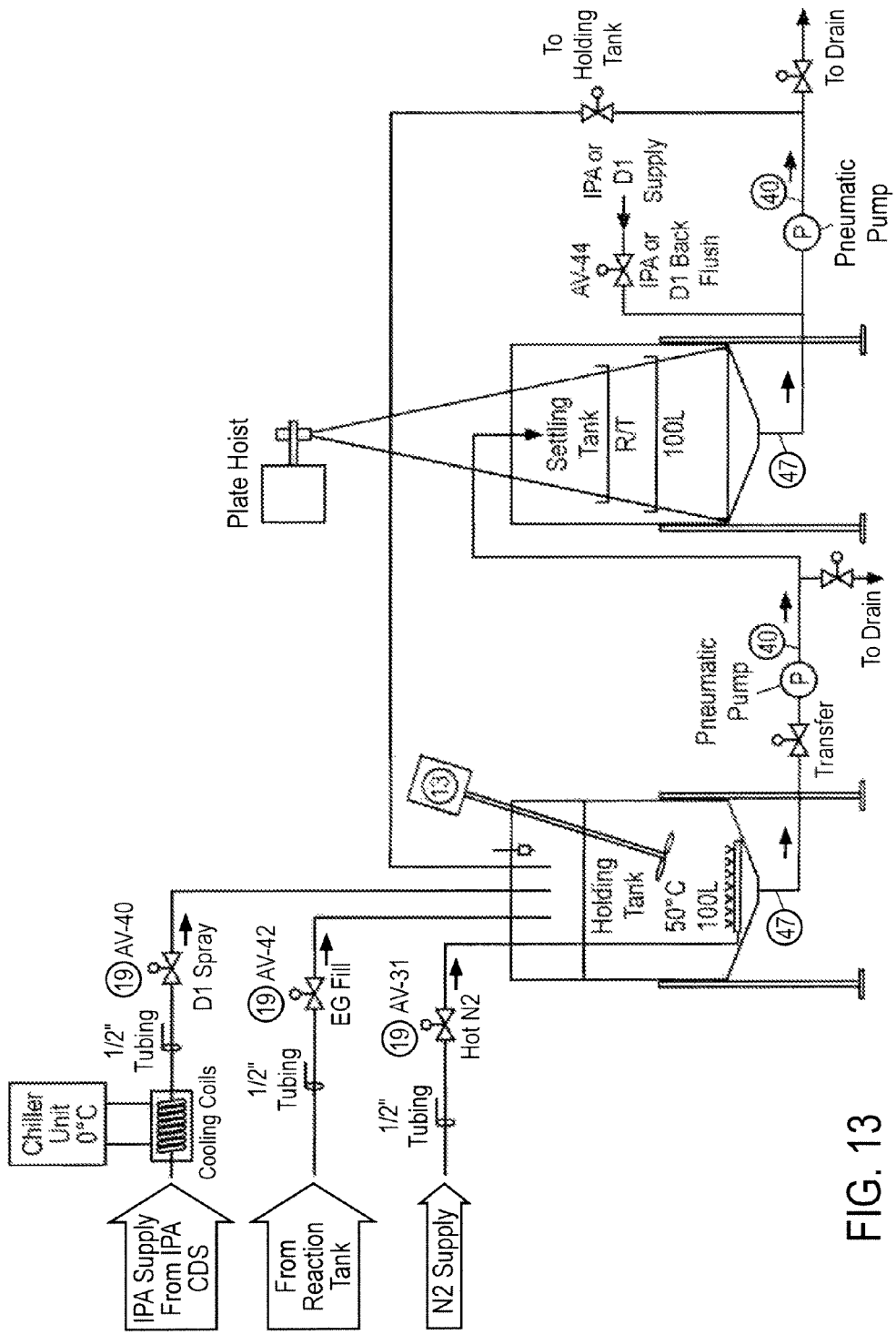
FIG. 13 is an example diagram of an embodiment of a purification stage described herein.

FIG. 13 is an example diagram of an embodiment of a purification stage described herein. A holding tank includes 3 inputs that come through ½" piping, through valves 19: 1) an influent from a reaction tank, 2) a nitrogen supply, which helps to provide low shear agitation, and 3) a supply of chilled alcohol. In the holding tank, there is also an impeller with perforated paddles, used for low shear agitation. From the holding tank, in which alcohol can be added to achieve an appropriate dilution or quenching, the fluid then travels through a pipe 47, driven by a pneumatic pump 40, into a settling tank. The settling tank includes 3 horizontal plates, onto which, depending on the situation, desired nanowires, or undesired agglomerates settle. In the case where the undesired agglomerates settle, a desired supernatant including the desired wires, can be pumped out through pipe 47, through a pneumatic pump 40, and back into the holding tank for a repeat, or out to a storage drain. In the case where the desired nanowires settle, the undesired supernatant with nanoparticles can be pumped out through pipe 47 through the pneumatic pump 40 either out to a drain/storage or to recycling.

Then, the plates can be removed by a plate hoist, and the desired nanowires can be rinsed off with an appropriate solvent.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, or process to the objective, spirit and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations are not limitations of the invention.

What is claimed is:

1. A method for production of nanowires, comprising:
  (a) providing a nanowire synthesis solution; and
  (b) conducting a reaction of the solution under mixing to produce a first batch of nanowires, the first batch of nanowires having a first value of a morphological characteristic selected from an average aspect ratio, an average length, and an average diameter, wherein conducting the reaction of the solution in (b) includes agitating the solution by circulating beads dispersed in the solution.

2. The method of claim 1, wherein conducting the reaction of the solution in (b) further includes agitating the solution by introducing a flow of a gas.

3. The method of claim 1, further comprising repeating operations (a) and (b) to produce subsequent batches of nanowires having respective values of the morphological characteristic, and a standard deviation of the values across all of the batches is no greater than 25% relative to an average value across all of the batches.

4. A method for production of nanowires, comprising:
  (a) providing a nanowire synthesis solution; and
  (b) conducting a reaction of the solution under mixing to produce a first batch of nanowires, the first batch of nanowires having a first value of a morphological characteristic selected from an average aspect ratio, an average length, and an average diameter, wherein conducting the reaction of the solution in (b) includes agitating the solution by moving a paddle relative to the solution, and agitating the solution is characterized by a Reynolds number below a turbulent threshold, wherein the paddle is a perforated paddle, and conducting the reaction of the solution in (b) includes agitating the solution by imparting a flow of the solution through holes in the perforated paddle.

5. A method for production of nanowires, comprising:
  (a) providing a nanowire synthesis solution in a reactor; and
  (b) conducting a reaction of the solution in the reactor, wherein conducting the reaction includes operating an agitation mechanism to impart mixing of the solution, wherein operating the agitation mechanism in (b) includes circulating beads dispersed in the solution.

6. The method of claim 5, wherein operating the agitation mechanism in (b) further includes introducing a flow of a fluid into the reactor.

7. The method of claim 6, wherein the fluid is a gas.

8. The method of claim 6, wherein operating the agitation mechanism in (b) further includes elevating a temperature of the fluid prior to introduction into the reactor.

9. A method for production of nanowires, comprising:
  (a) providing a nanowire synthesis solution in a reactor; and
  (b) conducting a reaction of the solution in the reactor, wherein conducting the reaction includes operating an agitation mechanism to impart mixing of the solution, wherein the agitation mechanism includes a perforated structure, and operating the agitation mechanism in (b) includes imparting motion to the perforated structure to induce a flow of the solution through holes in the perforated structure.

10. The method of claim 9, wherein at least one of holes is at least 0.3 cm in diameter.

11. The method of claim 9, wherein the perforated structure is a perforated disk, and operating the agitation mechanism in (b) includes imparting a reciprocating motion to the perforated disk.

12. The method of claim 11, wherein the reciprocating motion has a frequency of 0.01 to 10 cycles per second.

13. The method of claim 11, wherein operating the agitation mechanism in (b) includes retaining the perforated disk below a surface of the solution throughout the reciprocating motion.

14. The method of claim 11, wherein the reactor has a diameter d, and the perforated disk has a diameter in a range of 0.5 d to 0.95 d.

15. The method of claim 14, wherein the agitation mechanism includes a shaft connected to the perforated disk, and the shaft has a diameter in a range of 0.02 d to 0.1 d.

16. The method of claim 9, wherein the perforated structure is a perforated paddle, and operating the agitation mechanism in (b) includes rotating the perforated paddle.

* * * * *